US012659053B2

(12) United States Patent
Li et al.

(10) Patent No.: US 12,659,053 B2
(45) Date of Patent: Jun. 16, 2026

(54) OPTICAL PATH POINTING APPARATUS, OPTICAL PATH POINTING METHOD, AND OPTICAL PATH POINTING SYSTEM

(71) Applicant: HUAWEI TECHNOLOGIES CO., LTD., Shenzhen (CN)

(72) Inventors: Ying Li, Dongguan (CN); Zhipeng Xie, Dongguan (CN); Yan Zeng, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 18/354,843

(22) Filed: Jul. 19, 2023

(65) Prior Publication Data

US 2023/0370175 A1 Nov. 16, 2023

Related U.S. Application Data

(63) Continuation of application No. PCT/CN2021/124738, filed on Oct. 19, 2021.

(30) Foreign Application Priority Data

Jan. 21, 2021 (CN) .......................... 202110082565.9

(51) Int. Cl.
*H04B 17/00* (2015.01)
*H04B 10/40* (2013.01)
(Continued)

(52) U.S. Cl.
CPC ............. *H04B 17/14* (2015.01); *H04B 10/40* (2013.01); *H04B 17/21* (2015.01)

(58) Field of Classification Search
CPC ........ H04B 17/14; H04B 10/40; H04B 17/21; H04B 10/114; H04B 10/116; G02B 26/0816; G02B 6/4214; G02B 27/30
See application file for complete search history.

(56) References Cited

U.S. PATENT DOCUMENTS

| | | | |
|---|---|---|---|
| 5,710,652 A | 1/1998 | Bloom et al. | |
| 10,439,716 B2 * | 10/2019 | Miller | H04B 10/1123 |
| 2016/0087722 A1 | 3/2016 | Wabnig et al. | |

FOREIGN PATENT DOCUMENTS

| | | | | |
|---|---|---|---|---|
| CN | 102195717 A | * | 9/2011 | |
| CN | 111736358 A | * | 10/2020 | G02B 27/30 |
| JP | H06160683 A | | 6/1994 | |

OTHER PUBLICATIONS

Kaymak Yagiz et al: "A Survey on Acquisition; Tracking, and Pointing Mechanisms for Mobile Free-Space Optical Communications", IEEE Communications Surveys and Tutorials, vol. 20, No. 2, pp. 1104-1123, XP011684306.

(Continued)

*Primary Examiner* — Ping Y Hsieh

(74) *Attorney, Agent, or Firm* — HAUPTMAN HAM, LLP

(57) ABSTRACT

A first optical path pointing apparatus includes a first optical transceiver, a first position sensitive detector, and a first adjuster. The first optical transceiver is configured to transmit a first beacon light to a second optical path pointing apparatus and configured to receive the first beacon light reflected by a second prism in the second optical path pointing apparatus. The first position sensitive detector is configured to determine a first alignment angle of the first optical path pointing apparatus based on first information of a position at which the first beacon light reflected by the second prism reaches the first position sensitive detector and send the first alignment angle to the first adjuster. The first adjuster is configured to adjust the first alignment angle thereby generating an adjusted first alignment angle that satisfies a first pointing precision threshold.

13 Claims, 13 Drawing Sheets

(51) Int. Cl.
 *H04B 17/14*   (2015.01)
 *H04B 17/21*   (2015.01)

(56)      References Cited

OTHER PUBLICATIONS

Carrasco-Casado Alberto et al: "Design and early development of a UAV terminal and a ground station for laser communications", Unmanned/Unattended Sensors and Sensor Networks VIII SPIE, 1000 20th St. Bellingham WA 98225-6705 USA,vol. 8184, No. 1, Oct. 6, 2011 (Oct. 6, 2011), pp. 1-9, XP060009931.
Extended European Search Report issued in corresponding European Application No. 21920659.6, dated May 16, 2024, pp. 1-10.
International Search Report issued in corresponding International Application No. PCT/CN2021/124738, dated Jan. 19, 2022, pp. 1-10.
Japanese Office Action issued in corresponding Japanese Patent Application No. 2023-544021, dated Aug. 20, 2024, pp. 1-6.

* cited by examiner

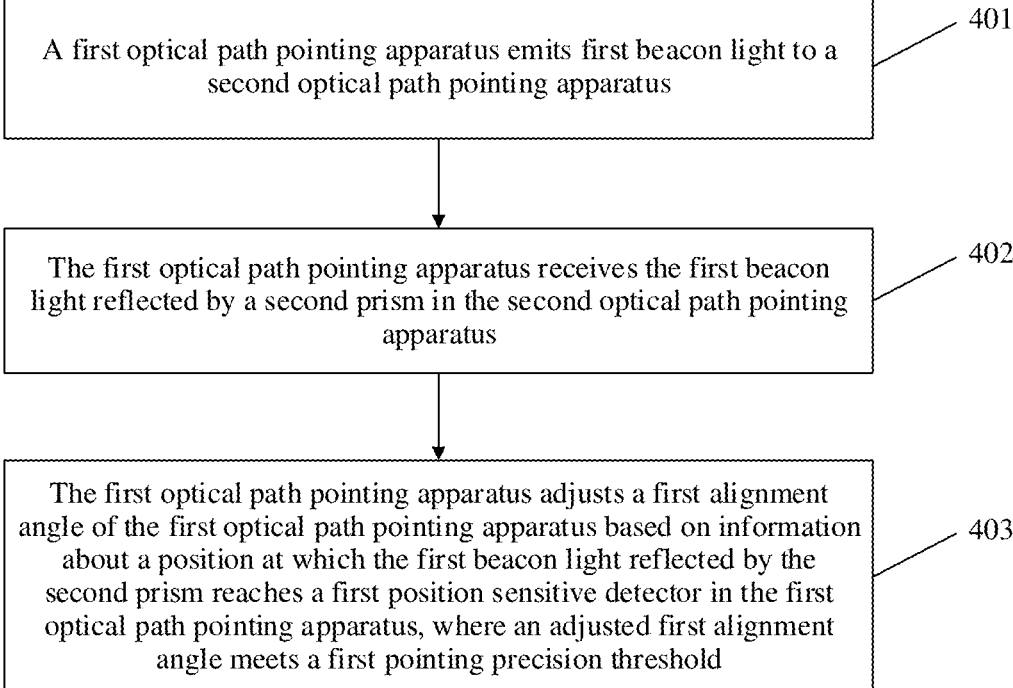

A first optical path pointing apparatus emits first beacon light to a second optical path pointing apparatus — 401

The first optical path pointing apparatus receives the first beacon light reflected by a second prism in the second optical path pointing apparatus — 402

The first optical path pointing apparatus adjusts a first alignment angle of the first optical path pointing apparatus based on information about a position at which the first beacon light reflected by the second prism reaches a first position sensitive detector in the first optical path pointing apparatus, where an adjusted first alignment angle meets a first pointing precision threshold — 403

FIG. 7

CONT.
FROM
FIG. 8A

Optical path pointing system

Rotating platform 2

Prism

Light generator

Optical transceiver

Position sensitive detector

Optical path obtained through rotation

Initial optical path

Rotating platform 1

Optical transceiver

Light generator

Position sensitive detector

OPTICAL PATH POINTING APPARATUS, OPTICAL PATH POINTING METHOD, AND OPTICAL PATH POINTING SYSTEM

CROSS-REFERENCE TO RELATED APPLICATIONS

This application is a continuation of International Application No. PCT/CN2021/124738, filed on Oct. 19, 2021, which claims priority to Chinese Patent Application No. 202110082565.9, filed on Jan. 21, 2021, the disclosures of the aforementioned applications are hereby incorporated by reference in their entireties.

TECHNICAL FIELD

This application relates to the field of optical communication technologies, and in particular, to an optical path pointing apparatus, an optical path pointing method, and an optical path pointing system.

BACKGROUND

Free space optical communication (free space optical communication, FSO) means a communication technology that uses light waves as carriers to transmit information in vacuum or atmosphere. A fast and accurate acquisition, tracking, and pointing (acquisition, tracking, and pointing, ATP) technology is a core technology to ensure space long-distance optical communication. An ATP system includes a target acquisition (coarse tracking) system and a tracking and pointing (fine tracking) system. The coarse tracking system is generally used to capture a target in a large field of view range by using a charge-coupled device (charge-coupled device, CCD) array, and implement coarse tracking together with a band-pass optical filter and a servo system of real-time signal processing. After the target is obtained, the fine tracking system is used to point and track the target in real time, which is generally implemented by using a position sensitive detector. In a long-distance scenario (for example, a distance between a STA side and an AP side is greater than 5 meters), a CCD has a large precision error when the ATP system performs pointing based on beacon light. Therefore, the ATP system needs to calculate a rotation angle of the servo system based on information of the position sensitive detector. However, in this scenario, the rotation angle that is of the servo system and that is calculated by the ATP system is inaccurate due to inaccurate information of the position sensitive detector. This reduces tracking and pointing precision.

SUMMARY

One or more embodiments of the present application provide an optical path pointing method, an optical path pointing apparatus, and an optical path pointing system, which help improve precision of tracking and pointing.

According to a first aspect, an embodiment of this application provides a first optical path pointing apparatus. The first optical path pointing apparatus includes a first optical transceiver, a first position sensitive detector, and a first adjustment module. The first optical transceiver is configured to emit first beacon light to a second optical path pointing apparatus. The first optical transceiver is further configured to receive the first beacon light reflected by a second prism in the second optical path pointing apparatus. The first position sensitive detector is configured to: determine a first alignment angle of the first optical path pointing apparatus based on information about a position at which the first beacon light reflected by the second prism reaches the first position sensitive detector, and send the first alignment angle to the first adjustment module. The first adjustment module is configured to adjust the first alignment angle. An adjusted first alignment angle meets a first pointing precision threshold.

In some embodiments the first optical path pointing apparatus may adjust the first alignment angle of the first optical path pointing apparatus based on the information about the position at which the first beacon light reflected by the second prism of the second optical path pointing apparatus reaches the first position sensitive detector, to implement fine pointing of the first optical path pointing apparatus. This helps improve precision of tracking and pointing.

In some embodiments, the first optical path pointing apparatus further includes a first prism. The first optical transceiver is further configured to: receive second beacon light emitted by the second optical path pointing apparatus, and emit the second beacon light to the first prism. The first prism is configured to reflect the second beacon light. Information about a position at which the second beacon light reflected by the first prism reaches a second position sensitive detector of the second optical path pointing apparatus is used to adjust a second alignment angle of the second optical path pointing apparatus. An adjusted second alignment angle meets a second pointing precision threshold.

In some embodiments the first prism in the first optical path pointing apparatus is configured to reflect the second beacon light to the second optical path pointing apparatus. In this way, the second optical path pointing apparatus may adjust the second alignment angle of the second optical path pointing apparatus based on the information about the position at which the second beacon light reflected by the first prism reaches the second position sensitive detector, to implement fine pointing of the second optical path pointing apparatus. This helps improve precision of tracking and pointing.

In some embodiments, the first optical transceiver includes a beam splitter and a dichroic mirror. The dichroic mirror is configured to receive second beacon light emitted by the second optical path pointing apparatus. The dichroic mirror is further configured to emit the second beacon light to the beam splitter. The beam splitter is configured to receive the second beacon light from the dichroic mirror. The beam splitter is further configured to emit the second beacon light to the first prism.

In some embodiments the first optical transceiver may specifically include the beam splitter and the dichroic mirror. The second beacon light is reflected or refracted by using the beam splitter and the dichroic mirror, so that the first prism in the first optical path pointing apparatus receives the second beacon light of the second optical path pointing apparatus.

In some embodiments, the dichroic mirror is further configured to receive the first beacon light reflected by the second prism. The dichroic mirror is further configured to emit, to the beam splitter, the first beacon light reflected by the second prism. The beam splitter is further configured to receive, from the dichroic mirror, the first beacon light reflected by the second prism. The beam splitter is further configured to emit, to the first position sensitive detector, the first beacon light reflected by the second prism.

In some embodiments the first beacon light is reflected or refracted by using the beam splitter and the dichroic mirror, and the first position sensitive detector in the first optical path pointing apparatus receives the first beacon light that is emitted by the first optical path pointing apparatus and that is reflected by the second prism, to perform fine pointing.

In some embodiments, the first optical path pointing apparatus further includes a first image capturing module and a sensor. The first image capturing module and the sensor are configured to: obtain an attitude angle between the first optical path pointing apparatus and the second optical path pointing apparatus, and send the attitude angle to the first adjustment module. The first adjustment module is further configured to receive the attitude angle, and adjust the first alignment angle of the first optical path pointing apparatus based on the attitude angle. An adjusted first alignment angle meets a third pointing precision threshold, and the third pointing precision threshold is greater than the first pointing precision threshold or the second pointing precision threshold.

In some embodiments, the first image capturing module and the sensor of the first optical path pointing apparatus, and the first adjustment module may jointly implement coarse pointing of the first optical path pointing apparatus. Precision of coarse pointing is lower than precision of fine pointing.

In some embodiments, a wavelength of the first beacon light is different from a wavelength of the second beacon light.

In some embodiments, the first optical path pointing apparatus may be provided with a light filter to filter out the second beacon light, so that the first position sensitive detector receives only the first beacon light reflected by the second prism, to adjust the first alignment angle of the first optical path pointing apparatus based on the information about the position at which the first beacon light reaches the first position sensitive detector.

In some embodiments, the first optical path pointing apparatus further includes a collimating mirror. The collimating mirror is configured to: after the first optical path pointing apparatus adjusts the first alignment angle, emit an optical signal to the second optical path pointing apparatus, to establish a communication link between the first optical path pointing apparatus and the second optical path pointing apparatus. The communication link and a beacon optical path for transmitting the first beacon light are coupled to each other.

In some embodiments, after the first optical path pointing apparatus adjusts the first alignment angle, the collimating mirror in the first optical path pointing apparatus emits the optical signal to the second optical path pointing apparatus, to establish the communication link between the first optical path pointing apparatus and the second optical path pointing apparatus. The communication link and the beacon optical path are coupled to each other, that is, when the communication link is also aligned based on the beacon optical path between the first optical path pointing apparatus and the second optical path pointing apparatus.

According to second aspect, an embodiment of this application provides a second optical path pointing apparatus. The second optical path pointing apparatus includes a second optical transceiver, a second position sensitive detector, and a second adjustment module. The second optical transceiver is configured to emit second beacon light to a first optical path pointing apparatus. The second optical transceiver is further configured to receive second beacon light reflected by a first prism in the first optical path pointing apparatus. The second position sensitive detector is configured to determine a second alignment angle of the second optical path pointing apparatus based on information about a position at which the second beacon light reflected by the first prism reaches the second position sensitive detector, and send the second alignment angle to the second adjustment module. The second adjustment module is configured to adjust the second alignment angle. An adjusted second alignment angle meets a second pointing precision threshold.

In some embodiments the second optical path pointing apparatus may adjust the second alignment angle of the second optical path pointing apparatus based on the information about the position at which the second beacon light reflected by the first prism of the first optical path pointing apparatus reaches the second position sensitive detector, to implement fine pointing of the second optical path pointing apparatus. This helps improve precision of tracking and pointing.

In some embodiments, the second optical path pointing apparatus further includes a second prism. The second optical transceiver is further configured to: receive first beacon light emitted by the first optical path pointing apparatus, and emit the first beacon light to the second prism. The second prism is configured to reflect the first beacon light. Information about a position at which the first beacon light reflected by the second prism reaches a first position sensitive detector of the first optical path pointing apparatus is used to adjust a first alignment angle of the first optical path pointing apparatus. An adjusted first alignment angle meets a first pointing precision threshold.

In some embodiments the second prism in the second optical path pointing apparatus is configured to reflect the first beacon light to the first optical path pointing apparatus. In this way, the first optical path pointing apparatus may adjust the first alignment angle of the first optical path pointing apparatus based on the information about the position at which the first beacon light reflected by the second prism reaches the first position sensitive detector, to implement fine pointing of the first optical path pointing apparatus. This helps improve precision of tracking and pointing.

In some embodiments, the second optical transceiver includes a beam splitter and a dichroic mirror. The dichroic mirror is configured to receive first beacon light emitted by the first optical path pointing apparatus. The dichroic mirror is further configured to emit the first beacon light to the beam splitter. The beam splitter is configured to receive the first beacon light from the dichroic mirror. The beam splitter is further configured to emit the first beacon light to the second prism.

In some embodiments the second optical transceiver may specifically include the beam splitter and the dichroic mirror. The first beacon light is reflected or refracted by using the beam splitter and the dichroic mirror, so that the second prism in the second optical path pointing apparatus receives the first beacon light of the first optical path pointing apparatus.

In some embodiments, the dichroic mirror is further configured to receive the second beacon light reflected by the first prism. The dichroic mirror is further configured to emit, to the beam splitter, the second beacon light reflected by the first prism. The beam splitter is further configured to receive, from the dichroic mirror, the second beacon light reflected by the first prism. The beam splitter is further configured to emit, to the second position sensitive detector, the second beacon light reflected by the first prism.

In some embodiments the second beacon light is reflected or refracted by using the beam splitter and the dichroic mirror, and the second position sensitive detector in the second optical path pointing apparatus receives the second beacon light that is emitted by the second optical path pointing apparatus and that is reflected by the first prism, to perform fine pointing.

In some embodiments, the second optical path pointing apparatus further includes a second image capturing module and a sensor. The second image capturing module and the sensor are configured to: obtain an attitude angle between the second optical path pointing apparatus and the first optical path pointing apparatus, and send the attitude angle to the second adjustment module. The second adjustment module is further configured to receive the attitude angle, and adjust the second alignment angle of the second optical path pointing apparatus based on the attitude angle. An adjusted second alignment angle meets a fourth pointing precision threshold, and the fourth pointing precision threshold is greater than the first pointing precision threshold or the second pointing precision threshold.

In some embodiments, the second image capturing module and the sensor of the second optical path pointing apparatus, and the second adjustment module may jointly implement coarse pointing of the second optical path pointing apparatus. Precision of coarse pointing is lower than precision of fine pointing.

In some embodiments, a wavelength of the first beacon light is different from a wavelength of the second beacon light.

In some embodiments, the second optical path pointing apparatus may be provided with a light filter to filter out the first beacon light, so that the second position sensitive detector receives only the second beacon light reflected by the first prism, to adjust the second alignment angle of the second optical path pointing apparatus based on the information about the position at which the second beacon light reaches the second position sensitive detector.

In some embodiments, the second optical path pointing apparatus further includes a collimating mirror. The collimating mirror is configured to: after the second optical path pointing apparatus adjusts the second alignment angle, emit an optical signal to the first optical path pointing apparatus, to establish a communication link between the second optical path pointing apparatus and the first optical path pointing apparatus. The communication link and a beacon optical path for transmitting the second beacon light are coupled to each other.

In some embodiments, after the second optical path pointing apparatus adjusts the second alignment angle, the collimating mirror in the second optical path pointing apparatus emits the optical signal to the first optical path pointing apparatus, to establish the communication link between the second optical path pointing apparatus and the first optical path pointing apparatus. The communication link and the beacon optical path are coupled to each other, that is, when the beacon optical path between the second optical path pointing apparatus and the first optical path pointing apparatus is aligned, the communication link is also aligned.

According to a third aspect, an embodiment of this application provides an optical path pointing method. The method may be performed by the first optical path pointing apparatus in the first aspect. The first optical path pointing apparatus emits first beacon light to a second optical path pointing apparatus. The first optical path pointing apparatus receives the first beacon light reflected by a second prism in the second optical path pointing apparatus. The first optical path pointing apparatus adjusts a first alignment angle of the first optical path pointing apparatus based on information about a position at which the first beacon light reflected by the second prism reaches a first position sensitive detector in the first optical path pointing apparatus. An adjusted first alignment angle meets a first pointing precision threshold.

In some embodiments the first optical path pointing apparatus may adjust the first alignment angle of the first optical path pointing apparatus based on the information about the position at which the first beacon light reflected by the second prism of the second optical path pointing apparatus reaches the first position sensitive detector, to implement fine pointing of the first optical path pointing apparatus. This helps improve precision of tracking and pointing.

In some embodiments, the first optical path pointing apparatus receives second beacon light emitted by the second optical path pointing apparatus. A first prism in the first optical path pointing apparatus reflects the second beacon light. Information about a position at which the second beacon light reflected by the first prism reaches a second position sensitive detector of the second optical path pointing apparatus is used to adjust a second alignment angle of the second optical path pointing apparatus. An adjusted second alignment angle meets a second pointing precision threshold.

In some embodiments the first prism in the first optical path pointing apparatus is configured to reflect the second beacon light to the second optical path pointing apparatus. In this way, the second optical path pointing apparatus may adjust the second alignment angle of the second optical path pointing apparatus based on the information about the position at which the second beacon light reflected by the first prism reaches the second position sensitive detector, to implement fine pointing of the second optical path pointing apparatus. This helps improve precision of tracking and pointing.

In some embodiments, before the first optical path pointing apparatus adjusts the first alignment angle of the first optical path pointing apparatus based on the information about the position at which the first beacon light reflected by the second prism reaches the first position sensitive detector in the first optical path pointing apparatus, the first optical path pointing apparatus obtains an attitude angle between the first optical path pointing apparatus and the second optical path pointing apparatus. The first optical path pointing apparatus adjusts the first alignment angle of the first optical path pointing apparatus based on the attitude angle. An adjusted first alignment angle meets a third pointing precision threshold. The third pointing precision threshold is greater than the first pointing precision threshold or the second pointing precision threshold.

In some embodiments the first optical path pointing apparatus can perform coarse pointing. Precision of coarse pointing is lower than precision of fine pointing.

In some embodiments, a wavelength of the first beacon light is different from a wavelength of the second beacon light.

In some embodiments, after the first optical path pointing apparatus adjusts the first alignment angle, the collimating mirror in the first optical path pointing apparatus emits an optical signal to the second optical path pointing apparatus, to establish a communication link between the first optical path pointing apparatus and the second optical path pointing apparatus. The communication link and a beacon optical path for transmitting the first beacon light are coupled to each other.

In some embodiments, after the first optical path pointing apparatus adjusts the first alignment angle, the collimating mirror in the first optical path pointing apparatus emits the optical signal to the second optical path pointing apparatus, to establish the communication link between the first optical path pointing apparatus and the second optical path pointing apparatus. The communication link and the beacon optical path are coupled to each other, that is, when the beacon optical path between the first optical path pointing apparatus and the second optical path pointing apparatus is aligned, the communication link is also aligned.

It should be noted that the first optical path pointing apparatus in the first aspect and the second optical path pointing apparatus in the second aspect have a symmetrical structure. In this case, the second optical path pointing apparatus in the second aspect may also perform a similar optical path pointing method in the third aspect.

According to a fourth aspect, an embodiment of this application provides a first optical path pointing apparatus. The first optical path pointing apparatus may be a device or a chip or a circuit disposed in a device. The first optical path pointing apparatus may implement, by using a processor, functions implemented by a unit and/or a module provided in the first aspect and/or any possible design of the first aspect.

According to a fifth aspect, an embodiment of this application provides a second optical path pointing apparatus. The second optical path pointing apparatus may be a device or a chip or a circuit disposed in a device. The first optical path pointing apparatus may implement, by using a processor, functions implemented by a unit and/or a module provided in the second aspect and/or any possible design of the second aspect.

According to a sixth aspect, an embodiment of this application provides an optical path pointing system. The optical path pointing system includes the first optical path pointing apparatus provided in the first aspect or the fourth aspect, and the second optical path pointing apparatus provided in the second aspect or the fifth aspect.

According to a seventh aspect, an embodiment of this application provides a computer-readable storage medium. The readable-storage medium includes a program or instructions. When the program or the instructions is/are run on a computer, the computer is enabled to perform the method in the third aspect or any possible implementation of the third aspect.

According to an eighth aspect, an embodiment of this application provides a chip or a chip system. The chip or the chip system includes at least one processor and an interface, the interface is interconnected to the at least one processor through a line, and the at least one processor is configured to run a computer program or instructions, to perform the method described in the third aspect or any possible implementation of the third aspect.

The interface in the chip may be an input/output interface, a pin, a circuit, or the like.

The chip system in the foregoing aspects may be a system-on-a-chip (system-on-a-chip, SOC), a baseband chip, or the like. The baseband chip may include a processor, a channel encoder, a digital signal processor, a modem, an interface module, and the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

According to a ninth aspect, an embodiment of this application provides a computer program or a computer program product, including code or instructions. When the code or the instructions is/are run on a computer, the computer is enabled to perform the method in third aspect or any possible implementation of the third aspect.

BRIEF DESCRIPTION OF DRAWINGS

FIG. 7 is a schematic flowchart of an optical path pointing method according to an embodiment of this application;

FIG. 8A and FIG. 8B are a schematic diagram of an optical path obtained through rotation of an optical path pointing apparatus according to an embodiment of this application;

DETAILED DESCRIPTION

The following describes the technical solutions in embodiments of this application with reference to the accompanying drawings in embodiments of this application.

Free space optical communication (free space optical communication, FSO) means a communication technology that uses light waves as carriers to transmit information in vacuum or atmosphere. A fast and accurate acquisition, tracking, and pointing (acquisition, tracking, and pointing, ATP) technology is a necessary core technology to ensure space long-distance optical communication. An ATP system generally includes a target acquisition (coarse tracking) system and a tracking and pointing (fine tracking) system.

The coarse tracking system is used to capture a target in a large field of view range, and a capture range may be ±1° to ±20° or greater. The coarse tracking system is generally implemented by using a charge-coupled device (charge-coupled device, CCD) array, and completes coarse tracking together with a band-pass optical filter and a servo system of real-time signal processing. Generally, for coarse tracking, a field of view is several milliradians (mrad), sensitivity is approximately 10 picowatts (pW), and tracking precision is tens of mrad.

After target acquisition is completed, the fine tracking system is generally used to point and track the target in real time by using a four-quadrant infrared detector (QD) or Q-APD high-sensitivity position sensor together with a corresponding servo system. Fine tracking requires tracking precision of several radians (rad) and tracking sensitivity of several nanowatts (nW).

Figure 1:
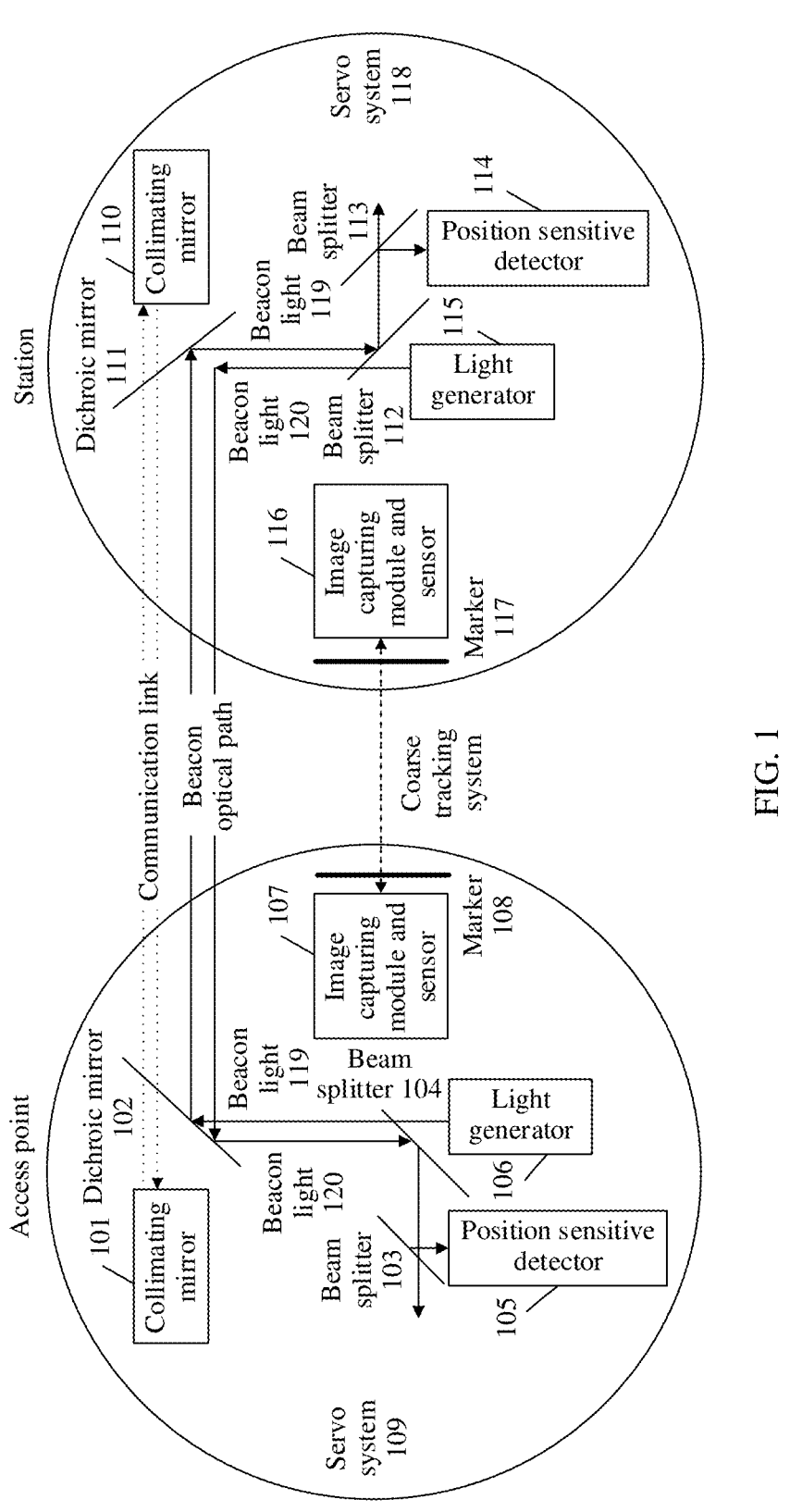
FIG. 1 is a schematic diagram of an optical path system.

FIG. 1 is a schematic diagram of a structure of an optical path system. The optical path system includes an access point (access point, AP) and a station (station, STA). The AP is a creator of a network, and is a central node of the network. For example, a wireless router used in a home or office is an AP. Each terminal (for example, a laptop, a personal digital assistant (personal digital assistant, PDA) or another user device that can be networked) connected to a wireless network may be referred to as a station.

In the optical path system shown in FIG. 1, an optical path structure on an AP side and an optical path structure on a STA side are designed according to a same principle, that is, the AP side and the STA side have same optical path structures. The optical path structure on the AP side includes a collimating mirror 101, a dichroic mirror 102, a beam splitter 103, a beam splitter 104, a position sensitive detector (position sensitive detector, PSD) 105, a light generator 106, an image capturing module and a sensor 107, a marker (marker) 108, and a servo system 109. The optical path structure on the STA side includes a collimating mirror 110, a dichroic mirror 111, a beam splitter 112, a beam splitter 113, a position sensitive detector 114, a light generator 115, an image capturing module and a sensor 116, a marker 117, and a servo system 118.

The dichroic mirror (dichroic mirror) is also referred to as a bichromatic mirror, and is configured to refract or transmit beacon light emitted by the light generator, and may be considered as an optical transceiver. The dichroic mirror features almost full transmission of light at a specific wavelength and almost complete reflection of light at other wavelengths. For example, the dichroic mirror 102 on the AP side may almost completely transmit beacon light emitted from the STA side to the beam splitter 103 on the AP side.

The beam splitter is configured to decompose white light into monochromatic light of different wavelengths by using a dispersion element (for example, a prism or a grating), to form a continuous visible light spectrum. The beam splitter may also be considered as an optical transceiver. For example, the beam splitter on the AP side may refract beacon light emitted from the STA side to the position sensitive detector 105 on the AP side.

The collimating mirror is connected to an optical signal generator by using an optical fiber, and is configured to receive, by using the optical fiber, an optical signal sent by the optical signal generator, and send the optical signal to the STA side, to establish a communication link.

For example, the collimating mirror 101 on the AP side is configured to send an optical signal in an optical fiber on the AP side to the collimating mirror 110 on the STA side, to establish a communication link between the AP side and the STA side. Similarly, the collimating mirror 110 on the STA side is configured to send an optical signal in an optical fiber on the STA side to the collimating mirror 101 on the AP side, to establish a communication link between the AP side and the STA side.

It should be noted that FIG. 1 is a schematic plane diagram of an optical path system. The collimating mirror 101 is actually further connected to the optical fiber on the AP side, and the optical fiber on the AP side is connected to the optical signal generator, and is configured to transmit an optical signal to the collimating mirror 101. The optical fiber on the AP side and the optical signal generator are not shown in FIG. 1. Similarly, the collimating mirror 110 is actually further connected to the optical fiber on the STA side, the optical fiber on the STA side is connected to the optical signal generator, and the optical fiber on the STA side and the optical signal generator are not shown in FIG. 1.

The light generator is configured to generate and emit beacon light (for example, laser light), to establish a beacon optical path. The light generator in this embodiment may include but is not limited to a laser, a light emitting diode, and the like.

For example, in the optical path system shown in FIG. 1, the light generator 106 on the AP side generates beacon light 119, and emits the beacon light 119 to the beam splitter 104. The beam splitter 104 emits the beacon light 119 to the dichroic mirror 102, and the dichroic mirror 102 receives the beacon light 119, and emits the beacon light 119 to the dichroic mirror 111 on the STA side. The dichroic mirror 111 on the STA side receives the beacon light 119, and emits the beacon light 119 to the beam splitter 112. The beam splitter 112 receives the beacon light 119, and emits the beacon light 119 to the beam splitter 113. The beam splitter 113 receives the beacon light 119, and emits the beacon light 119 to the position sensitive detector 114, to establish a beacon optical path from the AP side to the STA side, as shown in FIG. 1.

For another example, in the optical path system shown in FIG. 1, the light generator 115 on the STA side generates beacon light 120, and emits the beacon light 120 to the beam splitter 112. The beam splitter 112 receives the beacon light 120, and emits the beacon light 120 to the dichroic mirror 111. The dichroic mirror 111 receives the beacon light 120, and emits the beacon light 120 to the dichroic mirror 102 on the AP side. The dichroic mirror 102 receives the beacon light 120, and emits the beacon light 120 to the beam splitter 104. The beam splitter 104 receives the beacon light 120, and emits the beacon light 120 to the beam splitter 103. The beam splitter 103 receives the beacon light 120, and emits the beacon light 120 to the position sensitive detector 105, to establish a beacon optical path from the STA side to the AP side.

It should be noted that the beacon light emitted by the beam splitter in this embodiment may be beacon light transmitted by the beam splitter, or may be beacon light reflected by the beam splitter. Similarly, the beacon light emitted by the dichroic mirror may be the beacon light refracted by the dichroic mirror, or may be the beacon light transmitted by the dichroic mirror. A specific implementation is not limited in this embodiment.

In conclusion, the beacon light 119 from the AP side to the STA side passes through a beacon optical path formed by reflection or refraction of a plurality of elements, and the beacon light 120 from the STA side to the AP side passes through a beacon optical path formed by reflection or refraction of a plurality of elements, to form the beacon optical path between the AP side and the STA side. In the optical path system shown in FIG. 1, a communication link and the beacon optical path between the AP side and the STA side are fully coupled. Therefore, when the beacon optical path between the AP side and the STA side is aligned, the communication link between the AP side and the STA side is also aligned.

The position sensitive detector features high position resolution, a capability of reducing interference from sunlight, a capability of simultaneously measuring a position and intensity, and high reliability, and the like, and can be widely used in optical position and angle measurement and control, displacement and vibration monitoring, laser beam calibration, and the like. In this embodiment, the PSD may be used to perform laser beam calibration because of the capability of measuring a position of the PSD.

For example, the position sensitive detector 105 on the AP side is configured to obtain PSD information on the AP side. The PSD information may be a displacement of the position sensitive detector 105 caused by rotation of the servo system 109 on the AP side. The position sensitive detector 105 on the AP side may calculate an alignment angle on the AP side based on the PSD information on the AP side, and adjust the alignment angle on the AP side by using the servo system, to implement beacon optical path alignment between the AP side and the STA side. It may be understood that, for the AP side, the position sensitive detector 105 and the servo system 109 are configured to implement fine tracking of the target (the STA side). Correspondingly, the servo system 118 and the position sensitive detector 114 that are on the STA side also have similar functions. Details are not described herein again.

The image capturing module and the sensor are configured to obtain image information by using a CCD image sensor, and may include the following plurality of modules: a front-end optical system, a CCD image capturing module, an analog-to-digital conversion module, an image processing module, a data storage module, and the like. It should be noted that in this embodiment, the image capturing module may be implemented by running specified software code on a processor, or the image capturing module may be implemented by using an application-specific integrated circuit, which is not limited in this embodiment. The marker is used to mark a position of the servo system, so that the image capturing module and the sensor can find the marker to determine the position of the servo system during area scanning. The servo system is used to carry various elements (including the collimating mirror, the light generator, the beam splitter, the dichroic mirror, the position sensitive detector, the image capturing module and the sensor, and the marker) in the foregoing embodiments, and is a rotatable device. For example, the servo system may be a rotating platform or another system that can rotate. This is not limited in this embodiment.

For example, the image capturing module and the sensor 107 and the servo system 109 that are on the AP side may perform area scanning to find the marker 117 on the STA side, to determine a position of the servo system 118 on the STA side. The image capturing module and the sensor 107 that are on the AP side may further determine an attitude angle between the marker 108 on the AP side and the marker 117 on the STA side, and perform coarse pointing by adjusting the attitude angle. Correspondingly, the image capturing module and the sensor 116, the marker 117, and the servo system 118 that are on the STA side also have similar functions. Details are not described herein again.

In some embodiments, based on the design of the optical path system shown in FIG. 1, when the beacon optical path between the AP side and the STA side is aligned, the communication link is also aligned. However, in a long-distance scenario (for example, a distance between the AP side and the STA side is greater than 5 meters), a CCD has a large precision error when the optical path system shown in FIG. 1 performs pointing based on beacon light. Therefore, a fine tracking system including the position sensitive detector and the servo system needs to calculate a rotation angle of the servo system based on information of the position sensitive detector. However, in this scenario, an information value read by the position sensitive detector is small and fluctuates. This leads to an inaccurate rotation angle of the servo system for calculation, thereby reducing precision of tracking and pointing.

To resolve the foregoing problem, embodiments of this application provide an optical path pointing apparatus, an optical path pointing method, and an optical path pointing system, which help improve precision of tracking and pointing.

Figure 2:
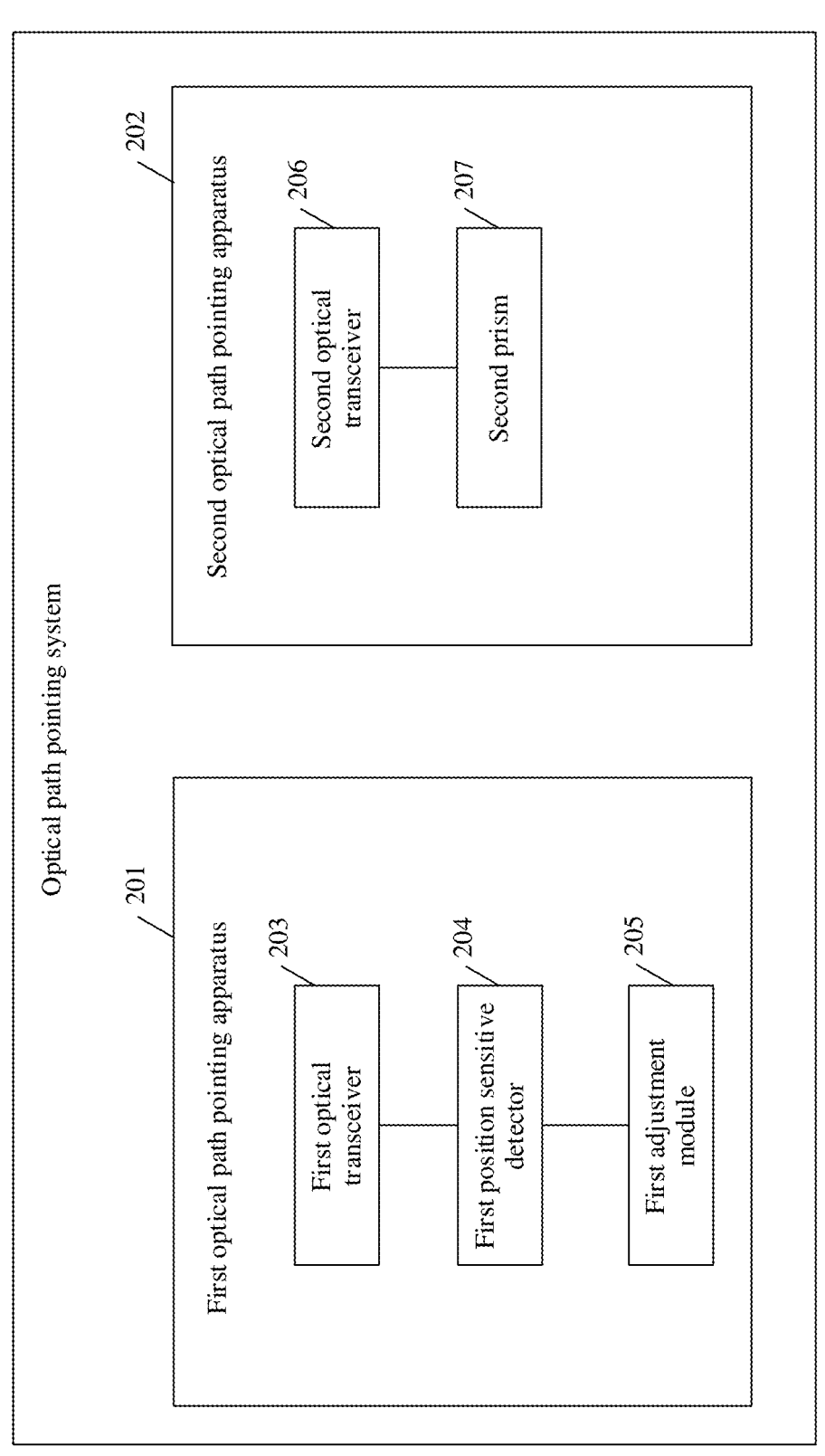
FIG. 2 is a schematic diagram of an optical path pointing system according to an embodiment of this application.

FIG. 2 shows an optical path pointing system according to an embodiment of this application. The optical path pointing system includes two ends: a first optical path pointing apparatus 201 and a second optical path pointing apparatus 202. The first optical path pointing apparatus 201 includes a first optical transceiver 203, a first position sensitive detector 204, and a first adjustment module 205. The second optical path pointing apparatus 202 includes a second optical transceiver 206 and a second prism 207. The optical path pointing system shown in FIG. 2 may be considered as a fine tracking system.

The first optical transceiver 203 in the first optical path pointing apparatus 201 is configured to emit first beacon light to the second optical path pointing apparatus 202. For example, the first optical transceiver 203 emits first beacon light to the second optical transceiver 206 in the second optical path pointing apparatus 202. Correspondingly, the second optical transceiver 206 in the second optical path pointing apparatus 202 receives the first beacon light, and emits the first beacon light to the second prism 207.

The prism may change a propagation direction of light, and has a function of symmetrically returning an optical path. The prism in this embodiment may include but is not limited to a pyramidal prism, a triangular prism, and the like. For example, the second prism 207 in the second optical path pointing apparatus 202 may reflect the received first beacon light back to the first optical path pointing apparatus 201 based on an optical path of the first beacon light from the first optical path pointing apparatus 201 to the second optical path pointing apparatus 202.

The first optical transceiver 203 is further configured to receive the first beacon light reflected by the second prism 207 in the second optical path pointing apparatus 202. For example, the second prism 207 reflects the first beacon light, that is, the second optical transceiver 206 emits the first beacon light to the first optical transceiver 203. The first optical transceiver 203 receives the first beacon light reflected by the second prism 207, and emits the first beacon light reflected by the second prism 207 to the first position sensitive detector 204. Correspondingly, the first position sensitive detector 204 receives the first beacon light reflected by the second prism 207.

The first position sensitive detector 204 is configured to determine a first alignment angle of the first optical path pointing apparatus 201 based on information about a position at which the first beacon light reflected by the second prism 207 reaches the first position sensitive detector 204, and send the first alignment angle to the first adjustment module 205. The first alignment angle may be considered as an adjusted alignment angle in the fine tracking system.

The first adjustment module 205 is configured to adjust the first alignment angle of the first optical path pointing apparatus 201, where an adjusted first alignment angle meets a first pointing precision threshold. The first adjustment module 205 may be the servo system in the embodiment in FIG. 1, or may be any rotatable system (for example, a rotating platform), which is not limited in this embodiment. The first adjustment module 205 adjusts the first alignment angle by rotating.

For example, the first position sensitive detector 204 may calculate and determine a first alignment angle, and send the first alignment angle to the first adjustment module 205. The first adjustment module 205 receives the first alignment angle, and adjusts the first alignment angle by rotating, so that an adjusted first alignment angle meets a first pointing precision threshold.

The first pointing precision threshold may be accurate to two decimal points or more than three decimal points. For example, the first pointing precision threshold may be ±0.03°, or may be in a smaller unit. The first pointing precision threshold herein is only an example, and is not limited in this embodiment.

Figure 3:
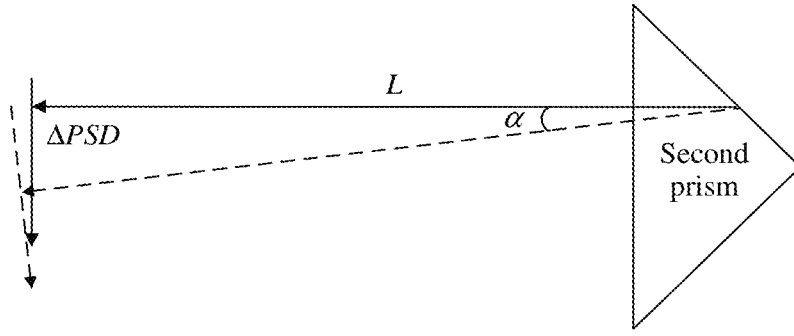
FIG. 3 is a schematic diagram of an alignment angle according to an embodiment of this application.

For example, FIG. 3 is a schematic diagram of an alignment angle according to an embodiment of this application. A first optical path pointing apparatus is used as an example. An optical path shown by a solid line in FIG. 3 is an initial optical path formed by returning first beacon light by a second prism before the first optical path pointing apparatus rotates. An optical path shown by a dashed line in FIG. 3 is an optical path formed by returning the first beacon light by the second prism after the first optical path pointing apparatus rotates. In FIG. 3, a displacement of the first position sensitive detector in the rotated first optical path pointing apparatus is ΔPSD, where the displacement ΔPSD indicates a position deviation value between a position at which the first beacon light in the initial optical path reaches the first position sensitive detector, and a position at which the first beacon light in an optical path obtained through the rotation reaches the first position sensitive detector. A distance of an optical path between the first position sensitive detector and the second prism is L, and a rotation angle of the first optical path pointing apparatus is α, as shown in FIG. 3. The rotation angle α of the first optical path pointing apparatus is equivalent to a first alignment angle.

Based on the parameters described in FIG. 3, a calculation formula of the first alignment angle of the first optical path pointing apparatus may be deduced as: $\tan(\alpha) \approx \Delta PSD/L$. In other words, by returning the first beacon light through the second prism, the first position sensitive detector may calculate the first alignment angle. After determining the first alignment angle through calculation, the first position sensitive detector sends the first alignment angle to the first adjustment module, so that the first adjustment module can adjust the first alignment angle and improve pointing precision of the fine tracking system.

Figure 4:
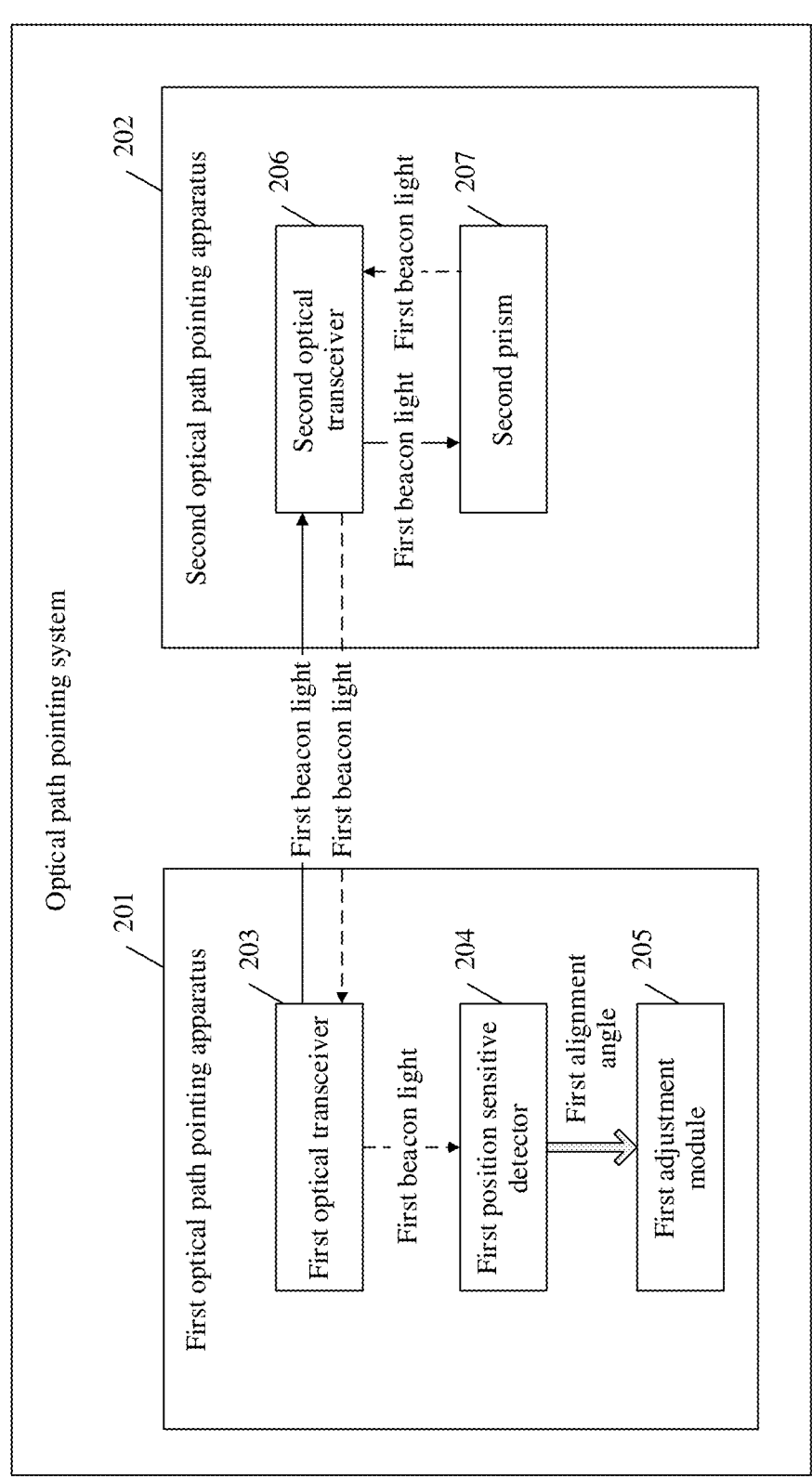
FIG. 4 is a schematic diagram of a beacon optical path in an optical path pointing system according to an embodiment of this application.

FIG. 4 shows a beacon optical path between the first optical path pointing apparatus 201 and the second optical path pointing apparatus 202 in the embodiment in FIG. 2. The first optical path pointing apparatus 201 emits first beacon light to the second optical path pointing apparatus 202 by using the first optical transceiver 203. A beacon optical path is shown by a solid line between the first optical transceiver 203 and the second optical transceiver 206 in FIG. 4. The second optical transceiver 206 in the second optical path pointing apparatus 202 receives the first beacon light, and emits the first beacon light to the second prism 207. A beacon optical path is shown by a solid line between the second optical transceiver 206 and the second prism 207 in FIG. 4. In other words, an optical path shown by a solid line in FIG. 4 may represent an initial optical path of the first beacon light.

If the second prism 207 has a function of symmetrically returning an optical path, the second prism 207 may reflect the first beacon light to the second optical transceiver 206. A beacon optical path is shown by a dashed line between the second prism 207 and the second optical transceiver 206 in FIG. 4. The second optical transceiver 206 receives the first beacon light reflected by the second prism 207, and emits the first beacon light reflected by the second prism 207 to the first optical transceiver 203. A beacon optical path is shown by a dashed line between the second optical transceiver 206 and the first optical transceiver 203 in FIG. 4. The first optical transceiver 203 receives the first beacon light reflected by the second prism 207, and emits the first beacon light reflected by the second prism 207 to the first position sensitive detector 204. A beacon optical path is shown by a dashed line between the first optical transceiver 203 and the first position sensitive detector 204 in FIG. 4. In other words, the optical path shown by the dashed line in FIG. 4 may represent a return optical path of the first beacon light, and the return optical path and the initial optical path of the first beacon light in FIG. 4 may be considered as symmetrical or coincident optical paths.

In some embodiments, the second prism 207 symmetrically returns the first beacon light emitted by the first optical path pointing apparatus 201 to the first position sensitive detector 204, so that the first optical path pointing apparatus 201 can determine the first alignment angle based on information about a position at which the returned first beacon light reaches the first position sensitive detector 204. The first position sensitive detector 204 sends the first alignment angle to the first adjustment module 205, so that the first adjustment module may adjust the first alignment angle by rotating, to align a beacon optical path between the first optical path pointing apparatus 201 and the second optical path pointing apparatus 202. This helps improve pointing precision of the fine tracking system.

Figure 5A:
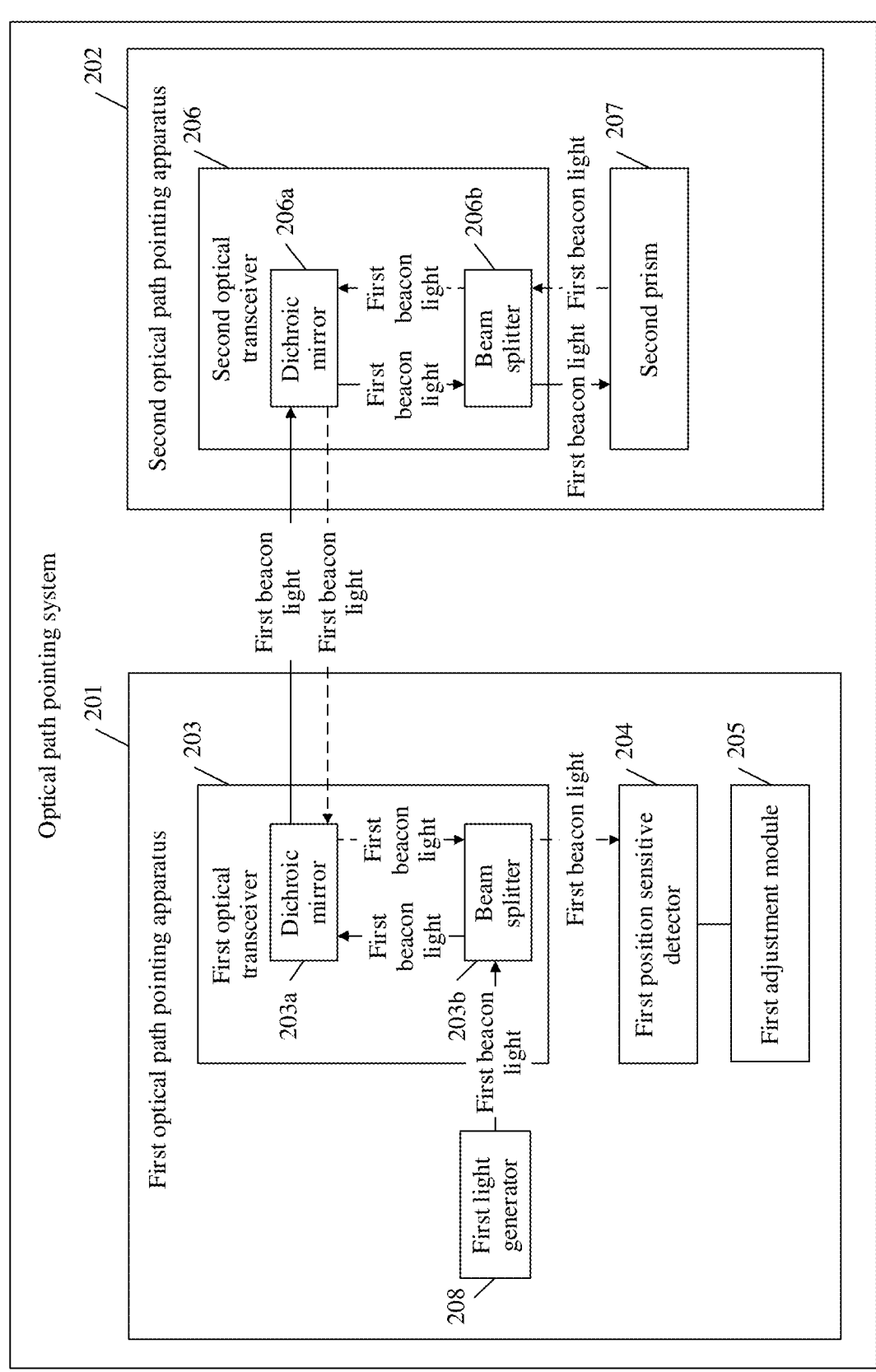
FIG. 5a is a schematic diagram of another optical path pointing system according to an embodiment of this application.

In an example, based on the optical path pointing system shown in FIG. 2, as shown in FIG. 5a, the first optical transceiver 203 may specifically include a dichroic mirror 203a and a beam splitter 203b. Similarly, the second optical transceiver 206 also specifically includes a dichroic mirror 206a and a beam splitter 206b. In some embodiments, the first optical path pointing apparatus 201 further includes a first light generator 208. The first light generator 208 is configured to generate first beacon light and emit the first beacon light to the second optical path pointing apparatus 202.

In an implementation, the beam splitter 203b is configured to receive the first beacon light emitted by the first light generator 208, and emit the first beacon light to the dichroic mirror 203a. The dichroic mirror 203a is configured to receive the first beacon light emitted by the beam splitter 203b, and emit the first beacon light to the dichroic mirror 206a in the second optical transceiver. The dichroic mirror 206a is configured to receive the first beacon light emitted by the dichroic mirror 203a, and emit the first beacon light to the beam splitter 206b. The beam splitter 206b is configured to receive the first beacon light emitted by the dichroic mirror 206a, and emit the first beacon light to the second prism 207. In some embodiments the first beacon light is emitted from the first light generator 208 and reaches the second prism through the foregoing plurality of modules. An initial optical path of the first beacon light is shown by a solid line in FIG. 5a.

In an implementation, the second prism 207 is further configured to reflect the first beacon light, and reflect the first beacon light to the beam splitter 206b. The beam splitter 206b is further configured to receive the first beacon light reflected by the second prism, and emit the first beacon light reflected by the second prism to the dichroic mirror 206a. The dichroic mirror 206a is further configured to receive the first beacon light reflected by the second prism, and emit the first beacon light reflected by the second prism to the dichroic mirror 203a of the first optical transceiver. The dichroic mirror 203a is further configured to receive the first beacon light reflected by the second prism, and emit the first beacon light reflected by the second prism to the beam splitter 203b. The beam splitter 203b is further configured to receive the first beacon light reflected by the second prism, and emit the first beacon light reflected by the second prism to the first position sensitive detector 204. In some embodiments the first beacon light returns to the first position sensitive detector through reflection of the second prism, and a return optical path of the first beacon light is shown by a dashed line in FIG. 5a.

That is, for the first optical path pointing apparatus 201, the dichroic mirror 203a and the beam splitter 203b jointly implement the function of the first optical transceiver 203. For the second optical path pointing apparatus 202, the dichroic mirror 206a and the beam splitter 206b jointly implement the function of the first optical transceiver 203.

Figure 5B:
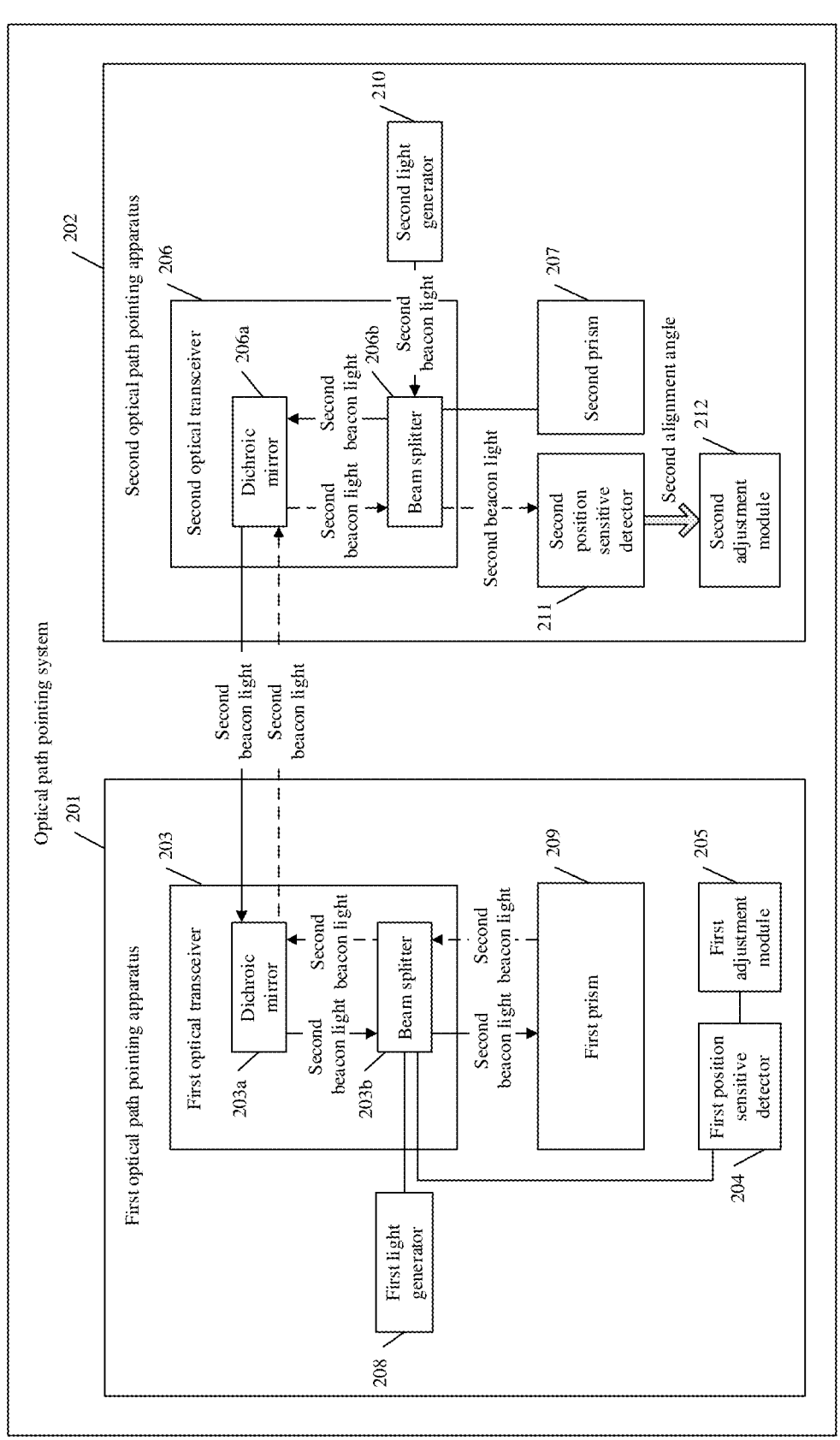
FIG. 5b is a schematic diagram of still another optical path pointing system according to an embodiment of this application.

In an example, based on the optical path pointing system shown in FIG. 5a, the first optical path pointing apparatus 201 further includes a first prism 209, and the second optical path pointing apparatus further includes a second light generator 210, a second position sensitive detector 211, and a second adjustment module 212, as shown in FIG. 5b.

The second light generator 210 is configured to generate second beacon light and emit the second beacon light to the first optical path pointing apparatus 201. The first prism 209 is configured to receive and reflect the second beacon light. The second position sensitive detector 211 is configured to: receive the second beacon light reflected by the first prism, and determine a second alignment angle based on a position at which the second beacon light reflected by the first prism reaches the second position sensitive detector. The second position sensitive detector 211 is further configured to send the second alignment angle to the second adjustment module 212, and the second adjustment module 212 adjusts the second alignment angle through rotation, so that an adjusted second alignment angle meets a second pointing precision threshold. The second pointing precision threshold is similar to the first pointing precision threshold, and may also be accurate to two decimal points or more than three decimal points. A value range of the second pointing precision threshold and a value range of the first pointing precision threshold may be the same, or may be different, which is not limited in this embodiment.

In an implementation, an initial optical path for emitting, by the second optical path pointing apparatus, the second beacon light to the first optical path pointing apparatus may be considered to include the following sections: The second light generator 210 is configured to generate the second beacon light, and emit the second beacon light to the beam splitter 206b. The beam splitter 206b is configured to receive the second beacon light, and emit the second beacon light to the dichroic mirror 206a. The dichroic mirror 206a is configured to receive the second beacon light, and emit the second beacon light to the dichroic mirror 203a. The dichroic mirror 203a is configured to receive the second beacon light, and emit the second beacon light to the beam splitter 203b. The beam splitter 203b is configured to receive the second beacon light, and emit the second beacon light to the first prism 209. In some embodiments the second beacon light passes through the foregoing plurality of elements, and optical paths formed by the second beacon light are initial optical paths of the second beacon light, as shown by solid lines in FIG. 5b.

In this embodiment, the first beacon light and the second beacon light are defined as light with different wavelengths. For the first optical path pointing apparatus 201, the beam splitter 203b may receive the first beacon light reflected by the second prism, or may receive the second beacon light emitted by the second optical path pointing apparatus. That is, the beam splitter 203b may emit the first beacon light reflected by the second prism and the second beacon light emitted by the second optical path pointing apparatus to the first position sensitive detector 204. Because the first beacon light and the second beacon light are light with different wavelengths, a light filter may be disposed between the first position sensitive detector 204 and the beam splitter 203b to filter the second beacon light, so that the first position sensitive detector 204 receives only the first beacon light reflected by the second prism, and calculates the first alignment angle based on information about a position at which the first beacon light reflected by the second prism reaches the first position sensitive detector.

In an implementation, similar to the second prism 207, the first prism 209 also has a function of symmetrically returning an optical path. In FIG. 5b, a return optical path of the second beacon light reflected by the first prism 209 may be considered to include the following sections: The first prism 209 is configured to reflect the second beacon light to the beam splitter 203b. The beam splitter 203b is configured to receive the second beacon light reflected by the first prism, and emit the second beacon light reflected by the first prism to the dichroic mirror 203a. The dichroic mirror 203a is configured to receive the second beacon light reflected by the first prism, and emit the second beacon light reflected by the first prism to the dichroic mirror 206a. The dichroic mirror 206a is configured to receive the second beacon light reflected by the first prism, and emit the second beacon light reflected by the first prism to the beam splitter 206b. The beam splitter 206b is further configured to receive the second beacon light reflected by the first prism, and emit the second beacon light reflected by the first prism to the second position sensitive detector 211. In some embodiments the second beacon light passes through the foregoing plurality of modules, and optical paths formed by the second beacon light are return optical paths of the second beacon light, as shown by dashed lines in FIG. 5b.

The second position sensitive detector 211 is configured to: receive the second beacon light reflected by the first prism 209, and calculate a second alignment angle based on a position at which the second beacon light reflected by the first prism reaches the second position sensitive detector 211. For a specific implementation, refer to the calculation of the alignment angle in the embodiment in FIG. 3. Details are not described herein again.

Because the first beacon light and the second beacon light are light with different wavelengths, similar to the light filter disposed in the first optical path pointing apparatus 201, a light filter may also be disposed between the second position sensitive detector 211 and the beam splitter 206b in the second optical path pointing apparatus 202. The light filter is configured to filter the first beacon light, so that the second position sensitive detector 211 receives only the second beacon light reflected by the first prism 209, and calculates the second alignment angle based on the information about the position at which the second beacon light reflected by the first prism reaches the second position sensitive detector 211.

In some embodiments in the optical path pointing system shown in FIG. 5b, the first prism is disposed in the first optical path pointing apparatus, and based on a characteristic of symmetrically returning an optical path by using the first prism, the second beacon light emitted by the second optical path pointing apparatus is reflected to the second position sensitive detector according to the return optical path, so as to adjust the second alignment angle of the second optical path pointing apparatus. According to the optical path pointing system shown in FIG. 5b, the second prism is disposed in the second optical path pointing apparatus, based on a characteristic of symmetrically returning an optical path by using the second prism, the first beacon light emitted by the first optical path pointing apparatus is reflected to the first position sensitive detector according to the return optical path, so as to adjust the first alignment angle of the first optical path pointing apparatus. This helps improve pointing precision of the fine tracking system.

Figure 5C:
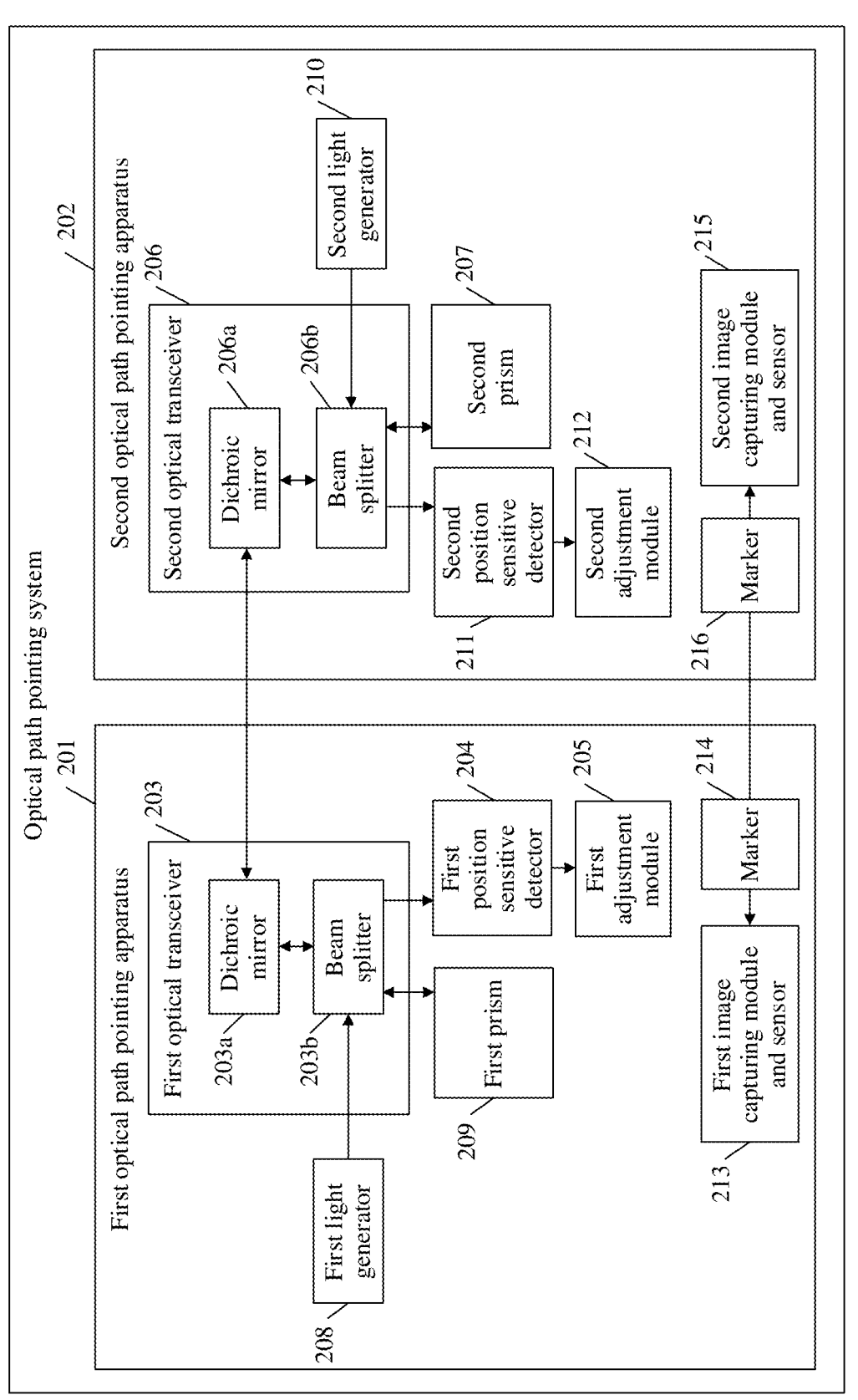
FIG. 5c is a schematic diagram of yet another optical path pointing system according to an embodiment of this application.

In some embodiments, based on the optical path pointing system shown in FIG. 5b, the first optical path pointing apparatus 201 further includes a first image capturing module and a sensor 213, and a marker 214. The second optical path pointing apparatus 202 further includes a second image capturing module and a sensor 215, and a marker 216. The plurality of modules are configured to implement coarse pointing between the first optical path pointing apparatus and the second optical path pointing apparatus, as shown in FIG. 5c.

The first image capturing module and the sensor 213 are configured to: obtain an attitude angle between the first optical path pointing apparatus 201 and the second optical path pointing apparatus 202, and send the attitude angle to the first adjustment module 205. The first adjustment module 205 is configured to receive the attitude angle, and adjust the first alignment angle of the first optical path pointing apparatus 201 based on the attitude angle, where an adjusted first alignment angle meets a third pointing precision threshold. The attitude angle is an angle (including a horizontal angle and a vertical angle) between a center of the first image capturing module and the sensor 213 and the marker 216 of the second optical path pointing apparatus. That is, the first image capturing module and the sensor 213, and the first adjustment module 205 are configured to implement coarse pointing between the first optical path pointing apparatus 201 and the second optical path pointing apparatus 202.

Similarly, the second image capturing module and the sensor 215 also have functions similar to those of the first image capturing module and the sensor 213, and are configured to implement coarse pointing between the second optical path pointing apparatus 202 and the first optical path pointing apparatus 201. It should be noted that the third pointing precision threshold is a coarse pointing precision threshold, that is, the third pointing precision threshold is greater than the first pointing precision threshold or the second pointing precision threshold. For example, the third pointing precision threshold may be accurate to one decimal point. For example, the third pointing precision threshold may be ±0.1°, which is not limited in this embodiment.

Figure 5D:
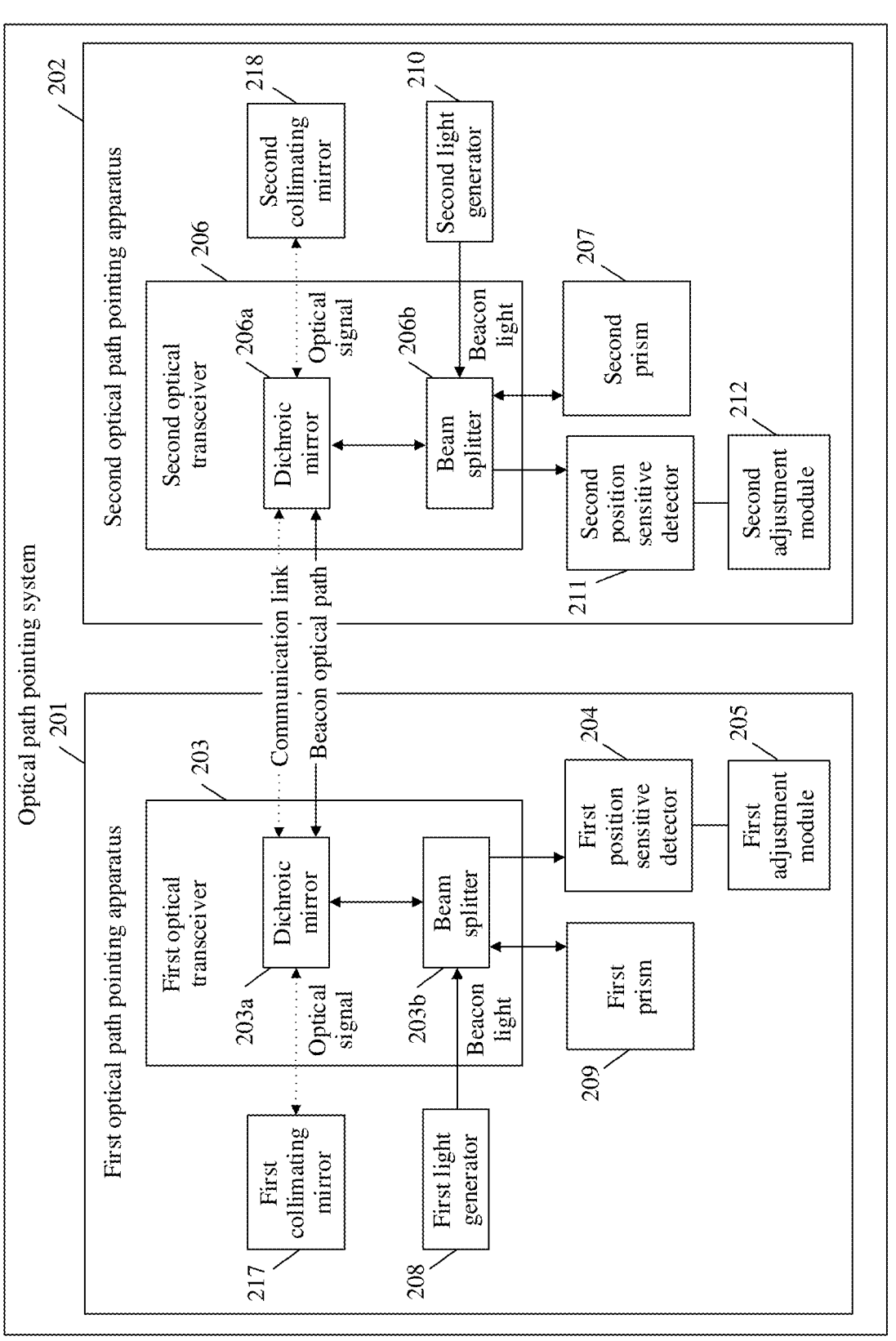
FIG. 5d is a schematic diagram of still yet another optical path pointing system according to an embodiment of this application.

In some embodiments, based on the optical path pointing system shown in FIG. 5b, the first optical path pointing apparatus 201 further includes a first collimating mirror 217, and the second optical path pointing apparatus 202 further includes a second collimating mirror 218, as shown in FIG. 5d. In the first optical path pointing apparatus 201, the first collimating mirror 217 is configured to emit an optical signal to the second optical path pointing apparatus 202, to establish a communication link between the first optical path pointing apparatus 201 and the second optical path pointing apparatus 202, as shown by a dashed line in FIG. 5d. The communication link and a beacon optical path for transmitting the first beacon light are mutually coupled, that is, when a beacon optical path between the first optical path pointing apparatus 201 and the second optical path pointing apparatus 202 is aligned, a communication link coupled to the beacon optical path is also aligned. Similarly, the second collimating mirror 218 also has a function similar to that of the first collimating mirror 217, and is configured to emit an optical signal to the first optical path pointing apparatus 201. It should be noted that the first collimating mirror 217 or the second collimating mirror 218 may be connected to an optical signal generation apparatus by using an optical fiber, and receive an optical signal by using the optical fiber.

Figure 6:
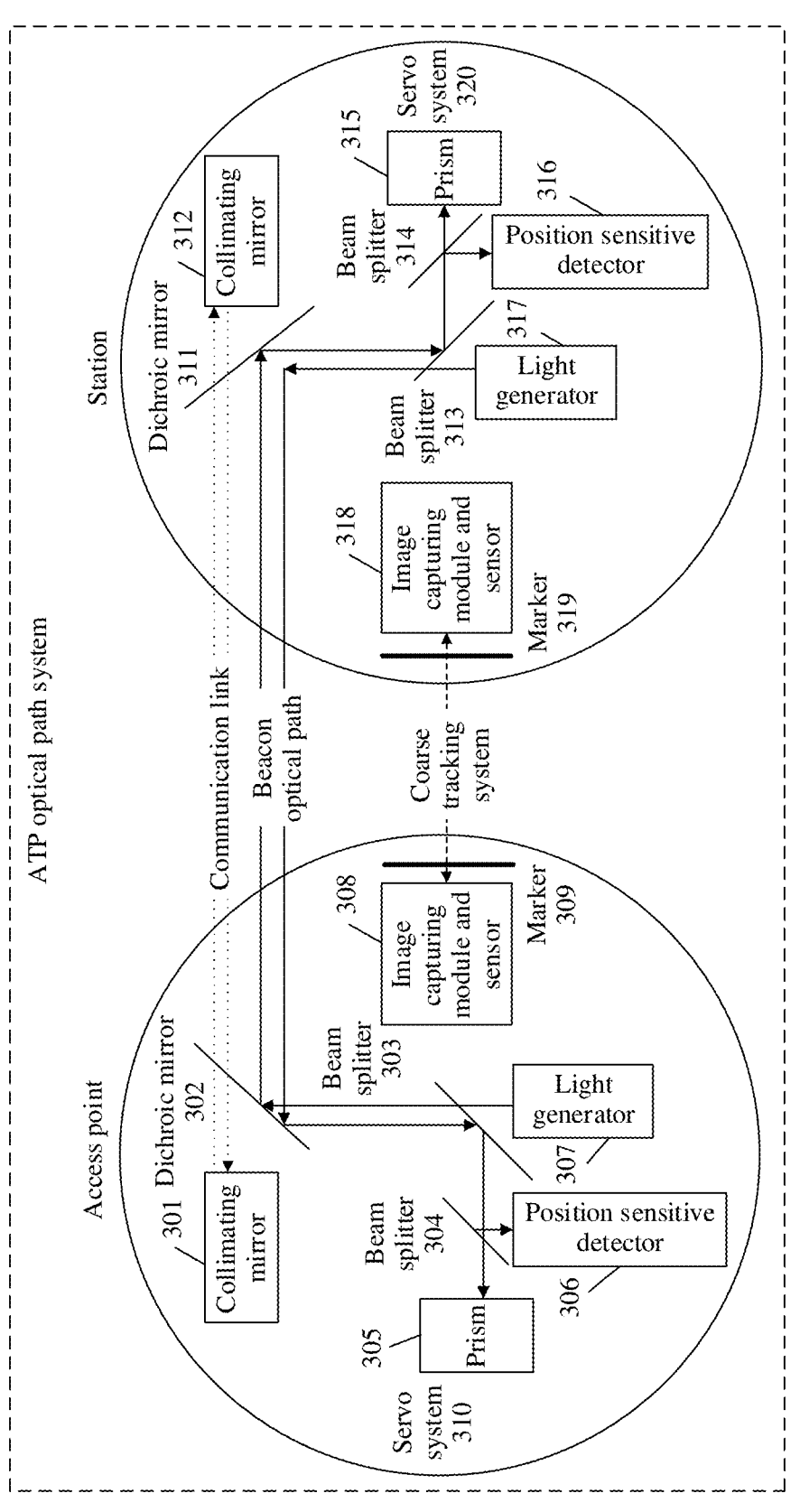
FIG. 6 is a schematic diagram of an ATP optical path system according to an embodiment of this application.

Based on pointing of the optical path pointing system in FIG. 2 to FIG. 5d, an ATP optical path system is described in detail by using a specific example below. FIG. 6 is a schematic diagram of a structure of an ATP optical path system according to an embodiment of this application. An AP side includes a collimating mirror 301, a dichroic mirror 302, a beam splitter 303, a beam splitter 304, a prism 305, a position sensitive detector 306, a light generator 307, an image capturing module and a sensor 308, a marker 309, and a servo system 310 310. In some embodiments, compared with the AP side in the optical path system shown in FIG. 1, the prism 305 is additionally disposed on the AP side in the ATP optical path system shown in FIG. 6, and is configured to implement functions implemented by the first prism in embodiments shown in FIG. 5b to FIG. 5d. For a specific implementation, refer to the related description of the first prism in the foregoing embodiment. Details are not described herein again.

A STA side includes a dichroic mirror 311, a collimating mirror 312, a beam splitter 313, a beam splitter 314, a prism 315, a position sensitive detector 316, a light generator 317, an image capturing module and a sensor 318, a marker 319, and a servo system 320. In some embodiments, compared with the STA side in the optical path system shown in FIG. 1, the prism 315 is additionally disposed on the STA side in the ATP optical path system shown in FIG. 6, and is configured to implement functions implemented by the second prism in embodiments shown in FIG. 4 to FIG. 5d. For a specific implementation, refer to the related description of the second prism in the foregoing embodiment. Details are not described herein again.

For example, in the ATP optical path system shown in FIG. 6, the AP side and the STA side reflect beacon light of each other by using a prism to perform optical path alignment. For the AP side, the light generator 307 on the AP side emits first beacon light, and the first beacon light is emitted to the dichroic mirror 302 by using the beam splitter 303, and then is emitted to the dichroic mirror 311 on the STA side by using the dichroic mirror 302. The dichroic mirror 311 receives the first beacon light, and emits the first beacon light to the beam splitter 313. The beam splitter 313 further emits the first beacon light to the beam splitter 314, and the beam splitter 314 further emits the first beacon light to the prism 315.

On the STA side, by using a characteristic of symmetrically returning an optical path of the prism 315, in this embodiment, an optical path through which the prism 315 reflects the first beacon light is the same as an optical path through which the AP side emits the first beacon light, that is, the first beacon light returns to the beam splitter 303 through the original path. The beam splitter 303 emits the first beacon light to the beam splitter 304, and the beam splitter 304 emits the first beacon light to the position sensitive detector 306, so that the position sensitive detector 306 calculates a first alignment angle based on a position at which the first beacon light reaches the position sensitive detector. The servo system 310 adjusts the first alignment angle, so that the AP side and the STA side are aligned.

For another example, for the STA side, a procedure similar to that on the AP side is used. The second beacon light emitted from the STA side is emitted to the prism 305 through the beam splitter 313, the dichroic mirror 311, the dichroic mirror 302, the beam splitter 303, and the beam splitter 304. By using a characteristic of symmetrically returning an optical path of the prism 305, in this embodiment, an optical path through which the prism 305 reflects the second beacon light is the same as an optical path through which the STA side transmits the second beacon light, that is, the second beacon light returns to the beam splitter 313 through the original path. The beam splitter 313 emits the second beacon light to the beam splitter 314, and the beam splitter 314 emits the second beacon light to the position sensitive detector 316, so that the position sensitive detector 316 calculates a second alignment angle based on a position at which the second beacon light reaches the position sensitive detector. The servo system 320 adjusts the second alignment angle, so that the STA side and the AP side are aligned.

It should be noted that the beam splitter 314 may also refract the first beacon light to the position sensitive detector 316 on the STA side, but a light filter may be disposed between the position sensitive detector 316 and the beam splitter 314, so that the first beacon light is filtered, that is, the first beacon light does not reach the position sensitive detector 316. Similarly, the beam splitter 304 may also refract the second beacon light to the position sensitive detector 306 on the AP side, but a light filter may be disposed between the position sensitive detector 306 and the beam splitter 304, so that the second beacon light is filtered, that is, the second beacon light does not reach the position sensitive detector 306.

Based on the description of the optical path pointing systems in the embodiments of FIG. 2 to FIG. 6, the following describes in detail an optical path pointing method used in the optical path pointing system. FIG. 7 shows an optical path pointing method according to an embodiment of this application. The optical path pointing method may be performed by a first optical path pointing apparatus in the optical path pointing system shown in FIG. 2, and specifically includes the following steps.

401: A first optical path pointing apparatus emits first beacon light to a second optical path pointing apparatus.

402: The first optical path pointing apparatus receives the first beacon light reflected by a second prism in the second optical path pointing apparatus.

403: The first optical path pointing apparatus adjusts a first alignment angle of the first optical path pointing apparatus based on information about a position at which the first beacon light reflected by the second prism reaches a first position sensitive detector in the first optical path pointing apparatus. An adjusted first alignment angle meets a first pointing precision threshold.

The first optical path pointing apparatus emits the first beacon light to the second optical path pointing apparatus. Specifically, a first optical transceiver in the first optical path pointing apparatus emits the first beacon light to a second optical transceiver in the second optical path pointing apparatus. The second optical transceiver then emits the first beacon light to the second prism in the second optical path pointing apparatus. For a specific implementation, refer to related descriptions of the first optical transceiver, the second optical transceiver, the second prism, and an initial optical path of the first beacon light in the embodiments in FIG. 2 to FIG. 5d. Details are not described herein again.

The first optical path pointing apparatus receives the first beacon light reflected by the second prism in the second optical path pointing apparatus. Specifically, the first optical transceiver in the first optical path pointing apparatus receives the first beacon light reflected by the second prism, and the first optical transceiver emits the first beacon light reflected by the second prism to the first position sensitive detector. That is, the first position sensitive detector receives the first beacon light reflected by the second prism. For a specific implementation, refer to related descriptions of the first optical transceiver, the second optical transceiver, the second prism, the first position sensitive detector, and a return optical path of the first beacon light in the embodiments in FIG. 2 to FIG. 5d. Details are not described herein again.

The first position sensitive detector in the first optical path pointing apparatus may determine the first alignment angle based on information about a position at which the first beacon light reflected by the second prism reaches the first position sensitive detector. The first position sensitive detector then sends the first alignment angle to the first adjustment module in the first optical path pointing apparatus. The first adjustment module may adjust the first alignment angle, so that an adjusted first alignment angle meets the first pointing precision threshold. For a specific implementation, refer to related descriptions of the first position sensitive detector, the first alignment angle, and the first adjustment module in the embodiments in FIG. 2 to FIG. 5d. Details are not described herein again.

Figure 8A:
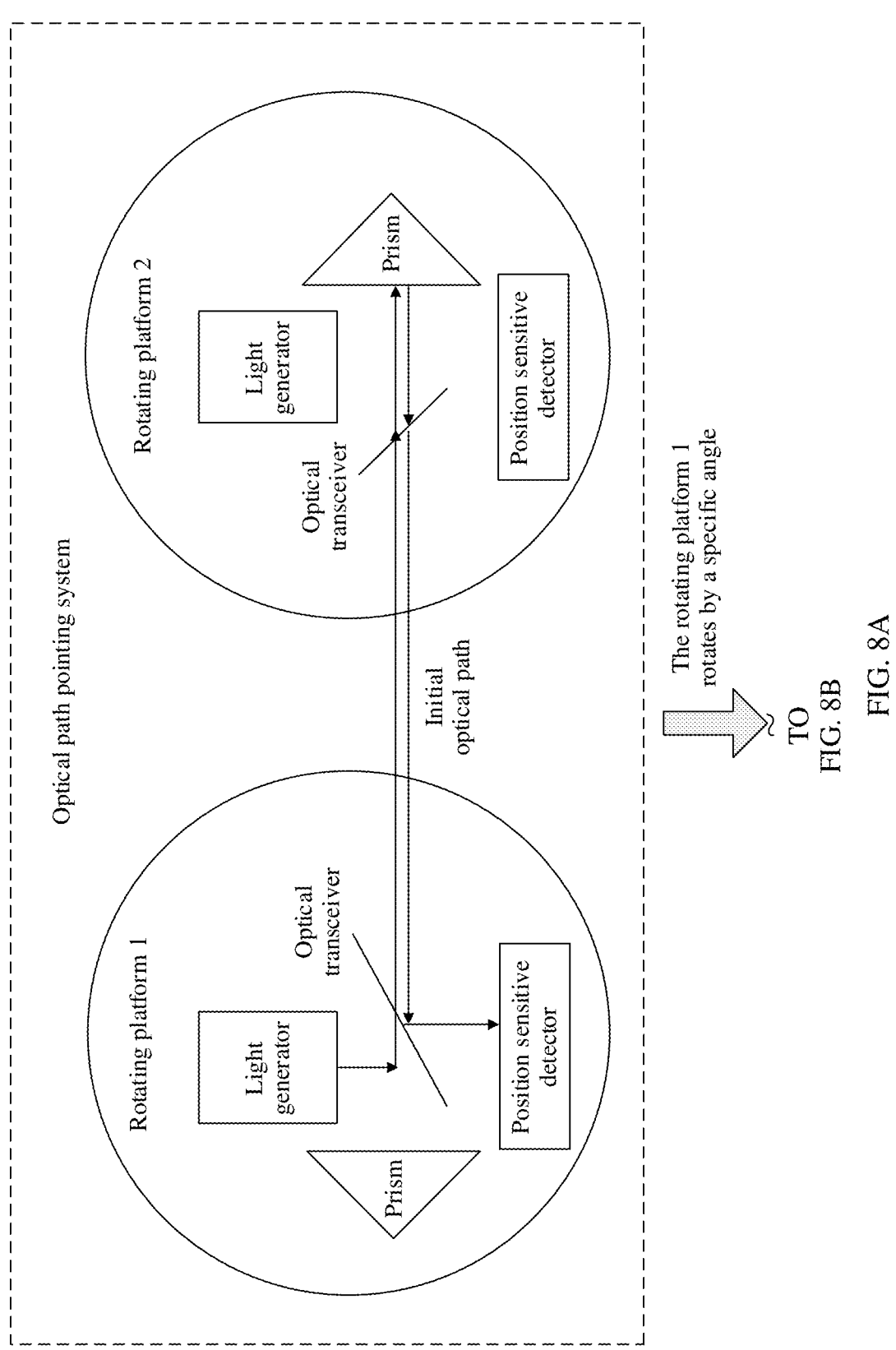

For example, FIG. 8A and FIG. 8B are a schematic diagram of an optical path obtained through rotation of an optical path pointing apparatus according to an embodiment of this application. To facilitate description of an alignment angle, a first optical path pointing apparatus is simplified as a rotating platform 1 in FIG. 8A and FIG. 8B, and the rotating platform 1 includes a light generator, an optical transceiver, a prism, and a position sensitive detector. A second optical path pointing apparatus is simplified as a rotating platform 2, and the rotating platform 2 includes a light generator, an optical transceiver, a prism, and a position sensitive detector. When neither the rotating platform 1 nor the rotating platform 2 rotates, for the rotating platform 1, the optical transceiver in the rotating platform 1 emits beacon light to the rotating platform 2. The prism in the rotating platform 2 returns the beacon light symmetrically, and the optical transceiver in the rotating platform 1 receives the beacon light symmetrically returned by the prism, and emits the beacon light symmetrically returned by the prism to the position sensitive detector to form an initial optical path as shown in FIG. 8A and FIG. 8B. The first position sensitive detector may calculate an alignment angle based on information about a position at which beacon light in the initial optical path reaches the position sensitive detector. If the alignment angle meets a preset first pointing precision threshold, the first optical path pointing apparatus is aligned with the second optical path pointing apparatus in an initial state. Similarly, the rotating platform 2 may also perform the foregoing steps by using the light generator, the optical transceiver, the prism, and the position sensitive detector, to establish an initial optical path, and determine that the first optical path pointing apparatus is aligned with the second optical path pointing apparatus in an initial state. Details are not described herein again.

After the rotating platform 1 rotates by a specific angle, the position sensitive detector in the rotating platform 1 may determine, based on information about a position at which beacon light of the rotating platform 1 reaches the position sensitive detector, whether an optical path obtained through the rotation is aligned. For example, the light generator in the rotating platform 1 continuously emits beacon light to the rotating platform 2, the prism in the rotating platform 2 returns the beacon light symmetrically, and the optical transceiver in the rotating platform 1 receives the beacon light symmetrically returned by the prism, and emits the beacon light symmetrically returned by the prism to the position sensitive detector to form an optical path obtained through the rotation, as shown in FIG. 8A and FIG. 8B. By comparing the initial optical path with the optical path obtained through the rotation, an alignment angle α of the rotating platform 1 is shown in FIG. 8A and FIG. 8B. The alignment angle may be determined based on the information about a position at which beacon light in the initial optical path reaches the position sensitive detector, and the information about a position at which beacon light in the optical path obtained through the rotation reaches the position sensitive detector. For a specific implementation, refer to the description in the embodiment in FIG. 3. Details are not described herein again. In some embodiments the rotating platform 1 may implement initial optical path alignment or alignment of the optical path obtained through the rotation by using the beacon light symmetrically returned by the prism in the rotating platform 2.

In an implementation, the first optical path pointing apparatus may further obtain an attitude angle between the first optical path pointing apparatus and the second optical path pointing apparatus, and adjust a first alignment angle of the first optical path pointing apparatus based on the attitude angle. An adjusted first alignment angle meets a third pointing precision threshold. The third pointing precision threshold is greater than the first pointing precision threshold or a second pointing precision threshold.

Specifically, the first optical path pointing apparatus may obtain the attitude angle between the first optical path pointing apparatus and the second optical path pointing apparatus by using the image capturing module and the sensor, and send the attitude angle to the first adjustment module. The first adjustment module may adjust the first alignment angle of the first optical path pointing apparatus based on the attitude angle, where an adjusted first alignment angle meets a third pointing precision threshold. For a specific implementation, refer to related descriptions of the image capturing module and the sensor in the embodiment shown in FIG. 5c. Details are not described herein again.

In an implementation, after the first optical path pointing apparatus adjusts the first alignment angle, a collimating mirror in the first optical path pointing apparatus emits an optical signal to the second optical path pointing apparatus to establish a communication link between the first optical path pointing apparatus and the second optical path pointing apparatus. The communication link and a beacon optical path for transmitting first beacon light are coupled to each other.

The first optical path pointing apparatus further includes a collimating mirror. The first optical path pointing apparatus emits an optical signal to the second optical path pointing apparatus by using the collimating mirror, to establish a communication link between the first optical path pointing apparatus and the second optical path pointing apparatus. For a specific implementation, refer to related description of the collimating mirror in the embodiment shown in FIG. 5d. Details are not described herein again.

In some embodiments the first optical path pointing apparatus in the embodiments in FIG. 2 to FIG. 5d may perform the optical path pointing method shown in FIG. 7. The first optical path pointing apparatus may adjust the first alignment angle by receiving first beacon light reflected by the second prism in the second optical path pointing apparatus, to implement beacon optical path alignment between that first optical path pointing apparatus and the second optical path pointing apparatus, so as to implement communication link alignment. It should be noted that, because the first optical path pointing apparatus and the second optical path pointing apparatus are mutually symmetrical apparatuses (that is, included components are the same), the second optical path pointing apparatus may also perform an optical path pointing method shown in FIG. 7. That is, the second optical path pointing apparatus may adjust a second alignment angle by receiving second beacon light reflected by the first prism in the first optical path pointing apparatus, to implement beacon optical path alignment between the first optical path pointing apparatus and the second optical path pointing apparatus, so as to implement communication link alignment.

Figure 9:
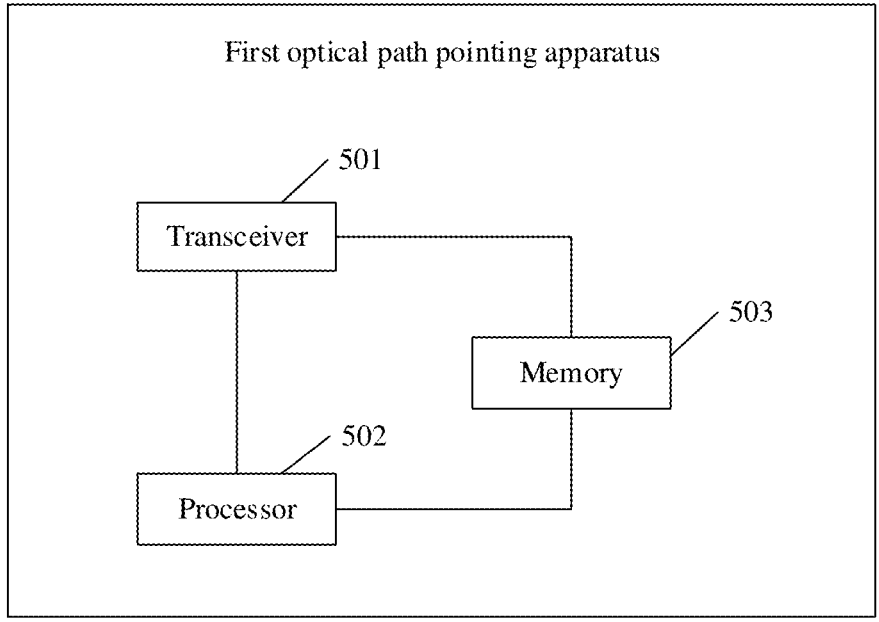
FIG. 9 is a schematic diagram of a structure of a first optical path pointing apparatus according to an embodiment of this application.

In an example, the first optical path pointing apparatus or the second optical path pointing apparatus in the foregoing embodiment may be a device or a chip or a circuit disposed in the device. FIG. 9 is a schematic diagram of a structure of a first optical path pointing apparatus according to an embodiment of this application. The first optical path pointing apparatus may be a device (for example, a chip) that performs the optical path pointing methods in the embodiments in FIG. 7 and FIG. 8A and FIG. 8B. The first optical path pointing apparatus may include a transceiver 501, at least one processor 502, and a memory 503. The transceiver 501, the processor 502, and the memory 503 may be connected to each other through one or more communication buses, or may be connected to each other in another manner.

The transceiver 501 may be configured to send data or receive data. It may be understood that the transceiver 501 is a general term, and may include a receiver and a transmitter.

The processor 502 may be configured to process data of the first optical path pointing apparatus. The processor 502 may include one or more processors. For example, the processor 502 may be one or more central processing units (central processing units, CPUs), one or more network processors (network processors, NPs), one or more hardware chips, or any combination thereof. When the processor 502 is one CPU, the CPU may be a single-core CPU or may be a multi-core CPU.

The memory 503 is configured to store program code and the like. The memory 503 may include a volatile memory (volatile memory), for example, a random access memory (random access memory, RAM). The memory 503 may also include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 503 may further include a combination of the foregoing types of memories.

The processor 502 and the memory 503 may be coupled through an interface, or may be integrated together. This is not limited in this embodiment.

The transceiver 501 and the processor 502 may be configured to implement the optical path pointing methods in the embodiments in FIG. 7 and FIG. 8A and FIG. 8B. A specific implementation is as follows:

The transceiver 501 is configured to emit first beacon light to a second optical path pointing apparatus.

The transceiver 501 is further configured to receive the first beacon light reflected by a second prism in the second optical path pointing apparatus.

The processor 502 is configured to adjust a first alignment angle of the first optical path pointing apparatus based on information about a position at which the first beacon light reflected by the second prism reaches a first position sensitive detector in the first optical path pointing apparatus. An adjusted first alignment angle meets a first pointing precision threshold.

In an implementation, the transceiver 501 is further configured to receive second beacon light emitted by the second optical path pointing apparatus.

The transceiver 501 is configured to reflect the second beacon light to the second optical path pointing apparatus. Information about a position at which the second beacon light reflected by the first prism reaches a second position sensitive detector in the second optical path pointing apparatus is used to adjust a second alignment angle of the second optical path pointing apparatus. An adjusted second alignment angle meets a second pointing precision threshold.

In an implementation, the processor 502 is further configured to obtain an attitude angle between the first optical path pointing apparatus and the second optical path pointing apparatus, and adjust the first alignment angle of the first optical path pointing apparatus based on the attitude angle. An adjusted first alignment angle meets a third pointing precision threshold. The third pointing accuracy threshold is greater than the first pointing accuracy threshold or the second pointing accuracy threshold.

In an implementation, a wavelength of the first beacon light is different from a wavelength of the second beacon light.

In an implementation, after the first optical path pointing apparatus adjusts the first alignment angle, the transceiver 501 is further configured to emit an optical signal to the second optical path pointing apparatus, to establish a communication link between the first optical path pointing apparatus and the second optical path pointing apparatus. The communication link and a beacon optical path for transmitting the first beacon light are coupled to each other.

Figure 10:
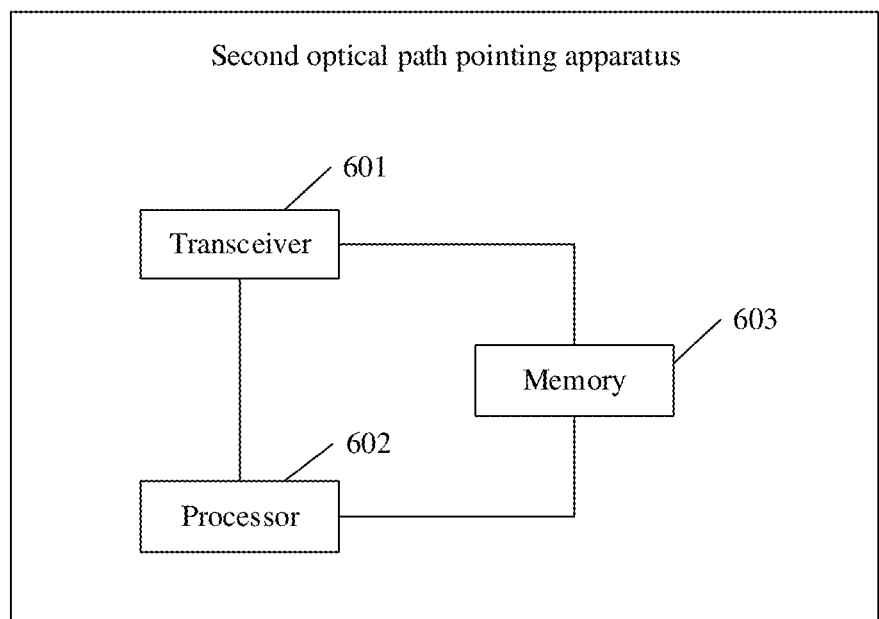
FIG. 10 is a schematic diagram of a structure of a second optical path pointing apparatus according to an embodiment of this application.

FIG. 10 is a schematic diagram of a structure of a second optical path pointing apparatus according to an embodiment of this application. The second optical path pointing apparatus may include a transceiver 601, at least one processor 602, and a memory 603. The transceiver 601, the processor 602, and the memory 603 may be connected to each other through one or more communication buses, or may be connected to each other in another manner.

The transceiver 601 may be configured to send data or receive data. It may be understood that the transceiver 601 is a general term, and may include a receiver and a transmitter.

The processor 602 may be configured to process data of the second optical path pointing apparatus. The processor 602 may include one or more processors. For example, the processor 602 may be one or more central processing units (central processing units, CPUs), one or more network processors (network processors, NPs), one or more hardware chips, or any combination thereof. When the processor 602 is one CPU, the CPU may be a single-core CPU or may be a multi-core CPU.

The memory 603 is configured to store program code and the like. The memory 603 may include a volatile memory (volatile memory), for example, a random access memory (random access memory, RAM). The memory 603 may also include a non-volatile memory (non-volatile memory), for example, a read-only memory (read-only memory, ROM), a flash memory (flash memory), a hard disk drive (hard disk drive, HDD), or a solid-state drive (solid-state drive, SSD). The memory 603 may further include a combination of the foregoing types of memories.

The processor 602 and the memory 603 may be coupled through an interface, or may be integrated together. This is not limited in this embodiment.

A specific implementation of the transceiver 601 and the processor 602 is as follows:

The transceiver 601 is configured to emit second beacon light to a first optical path pointing apparatus.

The transceiver 601 is further configured to receive the second beacon light reflected by a first prism in the first optical path pointing apparatus.

The processor 602 is configured to determine a second alignment angle of the second optical path pointing apparatus based on information about a position at which the second beacon light reflected by the first prism reaches a second position sensitive detector, and adjust the second alignment angle. An adjusted second alignment angle meets a second pointing precision threshold.

In an implementation, the transceiver 601 is further configured to receive first beacon light emitted by the first optical path pointing apparatus, and is further configured to emit the first beacon light to a second prism.

The transceiver 601 is further configured to reflect the first beacon light to the first optical path pointing apparatus. Information about a position at which the first beacon light reflected by the second prism reaches a first position sensitive detector in the first optical path pointing apparatus is used to adjust a first alignment angle of the first optical path pointing apparatus. An adjusted first alignment angle meets a first pointing precision threshold.

In an implementation, the processor 602 is further configured to obtain an attitude angle between the second optical path pointing apparatus and the first optical path pointing apparatus, and adjust the second alignment angle of the second optical path pointing apparatus based on the attitude angle. An adjusted second alignment angle meets a fourth pointing precision threshold. The fourth pointing accuracy threshold is greater than the first pointing accuracy threshold or the second pointing accuracy threshold.

In an implementation, a wavelength of the first beacon light is different from a wavelength of the second beacon light.

In an implementation, after the second optical path pointing apparatus adjusts the second alignment angle, the transceiver 601 is further configured to emit an optical signal to the first optical path pointing apparatus, to establish a communication link between the second optical path pointing apparatus and the first optical path pointing apparatus. The communication link and a beacon optical path for transmitting the second beacon light are coupled to each other.

Embodiments of this application provide a computer-readable storage medium. The computer-readable storage medium stores a program or instructions. When the program or the instructions is/are run on a computer, the computer is enabled to perform the optical path pointing method in embodiments of this application.

Embodiments of this application provide a chip or a chip system. The chip or the chip system includes at least one processor and an interface, the interface is interconnected to the at least one processor through a line, and the at least one processor is configured to run a computer program or instructions, to perform the optical path pointing method in embodiments of this application.

The interface in the chip may be an input/output interface, a pin, a circuit, or the like.

The chip system in the foregoing aspects may be a system-on-a-chip (system-on-a-chip, SOC), a baseband chip, or the like. The baseband chip may include a processor, a channel encoder, a digital signal processor, a modem, an interface module, and the like.

In an implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first optical path pointing apparatus, comprising:
a first optical transceiver;
a first position sensitive detector; and
a first adjuster, wherein
the first optical transceiver is configured to transmit a first beacon light to a second optical path pointing apparatus, and configured to receive the first beacon light reflected by a second prism in the second optical path pointing apparatus;
the first position sensitive detector is configured to:
determine a first alignment angle of the first optical path pointing apparatus based on first information of a position at which the first beacon light reflected by the second prism reaches the first position sensitive detector, and send the first alignment angle to the first adjuster; and
the first adjuster is configured to adjust the first alignment angle thereby generating an adjusted first alignment angle that satisfies a first pointing precision threshold.

2. The first optical path pointing apparatus according to claim 1, wherein the first optical path pointing apparatus further comprises:
a first prism, wherein
the first optical transceiver is further configured to receive a second beacon light from the second optical path pointing apparatus, and transmit the second beacon light to the first prism; and
the first prism is configured to reflect the second beacon light, wherein second information of a position at which the second beacon light reflected by the first prism reaches a second position sensitive detector of the second optical path pointing apparatus is useable to adjust a second alignment angle of the second optical path pointing apparatus thereby generating an adjusted second alignment angle that satisfies a second pointing precision threshold.

3. The first optical path pointing apparatus according to claim 2, wherein a wavelength of the first beacon light is different from a wavelength of the second beacon light.

4. The first optical path pointing apparatus according to claim 1, wherein the first optical transceiver comprises:
a beam splitter; and
a dichroic mirror, wherein
the dichroic mirror is configured to receive a second beacon light from the second optical path pointing apparatus, and to send the second beacon light to the beam splitter; and
the beam splitter is configured to receive the second beacon light from the dichroic mirror, and
to transmit the second beacon light to the first prism.

5. The first optical path pointing apparatus according to claim 4, wherein
the dichroic mirror is further configured to receive the first beacon light reflected by the second prism, and to send, to the beam splitter, the first beacon light reflected by the second prism; and the beam splitter is further configured to receive, from the dichroic mirror, the first beacon light reflected by the second prism, and to send, to the first position sensitive detector, the first beacon light reflected by the second prism.

6. The first optical path pointing apparatus according to claim 1, wherein the first optical path pointing apparatus further comprises a first image capturing module and a sensor;

the first image capturing module and the sensor are configured to: obtain an attitude angle between the first optical path pointing apparatus and the second optical path pointing apparatus, and send the attitude angle to the first adjuster; and the first adjuster is further configured: to receive the attitude angle and adjust the first alignment angle of the first optical path pointing apparatus based on the attitude angle, wherein an adjusted first alignment angle meets a third pointing precision threshold, and the third pointing precision threshold is greater than the first pointing precision threshold or the second pointing precision threshold.

7. The first optical path pointing apparatus according to claim 1, wherein the first optical path pointing apparatus further comprises:

a collimating mirror, wherein the collimating mirror is configured to after the first optical path pointing apparatus adjusts the first alignment angle, send an optical signal to the second optical path pointing apparatus thereby establishing a communication link between the first optical path pointing apparatus and the second optical path pointing apparatus, wherein the communication link and a beacon optical path are useable for transmitting the first beacon light, and are coupled to each other.

8. An optical path pointing method, wherein the method comprises:

transmitting, by a first optical path pointing apparatus, a first beacon light to a second optical path pointing apparatus;

receiving, by the first optical path pointing apparatus, the first beacon light reflected by a second prism in the second optical path pointing apparatus; and adjusting, by the first optical path pointing apparatus, a first alignment angle of the first optical path pointing apparatus based on first information of a position at which the first beacon light reflected by the second prism reaches a first position sensitive detector in the first optical path pointing apparatus, thereby generating an adjusted first alignment angle that satisfies a first pointing precision threshold.

9. The method according to claim 8, wherein the method further comprises:

receiving, by the first optical path pointing apparatus, a second beacon light from the second optical path pointing apparatus; and reflecting, by a first prism in the first optical path pointing apparatus, the second beacon light, wherein second information of a position at which the second beacon light reflected by the first prism reaches a second position sensitive detector in the second optical path pointing apparatus is useable to adjust a second alignment angle of the second optical path pointing apparatus thereby generating an adjusted second alignment angle that satisfies a second pointing precision threshold.

10. The method according to claim 9, wherein a wavelength of the first beacon light is different from a wavelength of the second beacon light.

11. The method according to claim 8, wherein before the adjusting, by the first optical path pointing apparatus, the first alignment angle of the first optical path pointing apparatus based on first information of the position at which the first beacon light reflected by the second prism reaches the first position sensitive detector in the first optical path pointing apparatus, thereby generating the adjusted first alignment angle that satisfies the first pointing precision threshold, the method further comprises:

acquiring, by the first optical path pointing apparatus, an attitude angle between the first optical path pointing apparatus and the second optical path pointing apparatus, and adjusting, by the first optical path pointing apparatus, the first alignment angle of the first optical path pointing apparatus based on the attitude angle, wherein an adjusted first alignment angle satisfies a third pointing precision threshold, and the third pointing precision threshold is greater than the first pointing precision threshold or the second pointing precision threshold.

12. The method according to claim 8, wherein the method further comprises:

after the first optical path pointing apparatus adjusts the first alignment angle of the first optical path pointing apparatus, sending, by a collimating mirror in the first optical path pointing apparatus, an optical signal to the second optical path pointing apparatus thereby establishing a communication link between the first optical path pointing apparatus and the second optical path pointing apparatus, wherein the communication link and a beacon optical path are usable for transmitting the first beacon light, and are coupled to each other.

13. An optical path pointing system, comprising: a first optical path pointing apparatus and a second optical path pointing apparatus, wherein the first optical path pointing apparatus comprises:

a first optical transceiver;

a first position sensitive detector; and a first adjuster, wherein the first optical transceiver is configured to transmit a first beacon light to a second optical path pointing apparatus, and configured to receive the first beacon light reflected by a second prism in the second optical path pointing apparatus;

the first position sensitive detector is configured to:

determine a first alignment angle of the first optical path pointing apparatus based on first information of a position at which the first beacon light reflected by the second prism reaches the first position sensitive detector, and send the first alignment angle to the first adjuster; and the first adjuster is configured to adjust the first alignment angle thereby generating an adjusted first alignment angle that satisfies a first pointing precision threshold.

* * * * *